(12) United States Patent
Dang

(10) Patent No.: US 10,197,088 B2
(45) Date of Patent: Feb. 5, 2019

(54) TAMPER RESISTANT CLOSURE MECHANISM FOR A UTILITY VAULT

(71) Applicant: Oldcastle Precast, Inc., Auburn, WA (US)

(72) Inventor: Nguyen Thai Dang, Madera, CA (US)

(73) Assignee: OLDCASTLE PRECAST, INC., Auburn, WA (US)

( * ) Notice: Subject to any disclaimer, the term of this patent is extended or adjusted under 35 U.S.C. 154(b) by 448 days.

(21) Appl. No.: 14/971,646

(22) Filed: Dec. 16, 2015

(65) Prior Publication Data

US 2016/0176629 A1 Jun. 23, 2016

Related U.S. Application Data

(63) Continuation-in-part of application No. 13/851,809, filed on Mar. 27, 2013, now Pat. No. 9,346,593, which is a continuation-in-part of application No. 13/294,054, filed on Nov. 10, 2011, now Pat. No. 8,835,757.

(60) Provisional application No. 61/616,125, filed on Mar. 27, 2012.

(51) Int. Cl.
*H02G 9/10* (2006.01)
*F16B 37/02* (2006.01)
*F16B 37/04* (2006.01)
*F16B 37/08* (2006.01)

(52) U.S. Cl.
CPC ............ *F16B 37/02* (2013.01); *F16B 37/041* (2013.01); *F16B 37/044* (2013.01); *F16B 37/0842* (2013.01); *F16B 37/0857* (2013.01); *H02G 9/10* (2013.01)

(58) Field of Classification Search
CPC .................................. H02G 9/10; E03B 7/095
USPC ..................................................... 174/37, 545
See application file for complete search history.

(56) References Cited

U.S. PATENT DOCUMENTS

| | | |
|---|---|---|
| 349,465 A | 9/1886 | Stevens |
| 2,055,166 A | 9/1936 | Berry |
| 2,114,499 A | 4/1938 | Maclear |
| 2,291,290 A | 7/1942 | Tinnerman |
| 2,342,312 A | 2/1944 | Tinnerman |
| 2,355,486 A | 8/1944 | Tinnerman |
| 2,364,668 A | 12/1944 | Simmons |
| 2,367,659 A | 1/1945 | Burke |

(Continued)

FOREIGN PATENT DOCUMENTS

| | | |
|---|---|---|
| DE | 3144890 | 5/1983 |
| DE | 29813074 | 11/1998 |

(Continued)

OTHER PUBLICATIONS

"Complaint with Jury Demand," filed Aug. 1, 2014, 61 pages.

(Continued)

*Primary Examiner* — King M Chu
(74) *Attorney, Agent, or Firm* — Sheridan Ross PC

(57) ABSTRACT

A nut configured to threadably engage an external thread of a bolt is provided. The nut generally comprises an upper portion that defines a first thread, a lower portion that defines a second thread, and a sidewall portion that connects the upper portion and the lower portion. The upper portion may be separated from the lower portion by a gap, and the sidewall portion may include a first sidewall spaced apart from a second sidewall.

18 Claims, 16 Drawing Sheets

(56) References Cited

U.S. PATENT DOCUMENTS

| | | | |
|---|---|---|---|
| 2,385,927 A | 10/1945 | Mason | |
| 2,396,835 A | 3/1946 | Eggert | |
| 2,401,671 A | 6/1946 | Thomas et al. | |
| 2,403,566 A | 7/1946 | Thorp et al. | |
| 2,404,672 A | 7/1946 | Volf | |
| 2,410,968 A | 11/1946 | Eggert | |
| 2,410,988 A | 11/1946 | Mevi | |
| 2,434,844 A | 1/1948 | Flora | |
| 2,552,499 A * | 5/1951 | Tinnerman | F16B 37/044 411/112 |
| 2,682,211 A | 6/1954 | Avila | |
| 2,727,552 A | 12/1955 | Chivosta | |
| 2,931,383 A | 4/1960 | Handley | |
| 3,029,964 A | 4/1962 | Hudson et al. | |
| 3,039,666 A | 6/1962 | Carpenter, Sr. | |
| 3,318,476 A | 5/1967 | Clark | |
| 3,385,012 A | 5/1968 | Lovegreen | |
| 3,530,696 A | 9/1970 | Dunmire | |
| 3,720,251 A | 3/1973 | Sygnator | |
| 3,727,438 A | 4/1973 | Knaack | |
| 3,760,234 A | 9/1973 | Jones et al. | |
| 3,858,614 A | 1/1975 | Moore et al. | |
| D237,285 S | 10/1975 | Helenurm | |
| 3,911,635 A | 10/1975 | Traupe | |
| 3,920,347 A | 11/1975 | Sauriol et al. | |
| 3,972,440 A | 8/1976 | Warren | |
| 3,974,599 A | 8/1976 | Grosh | |
| D244,173 S | 5/1977 | Thurman | |
| 4,059,199 A | 11/1977 | Quaney | |
| 4,074,491 A * | 2/1978 | Bell | B64C 1/06 411/116 |
| 4,163,503 A | 8/1979 | McKinnon | |
| 4,204,419 A | 5/1980 | Cale | |
| 4,266,380 A | 5/1981 | Samolis | |
| D279,952 S | 8/1985 | Daenen et al. | |
| 4,567,697 A | 2/1986 | Hahne | |
| D289,582 S | 5/1987 | Brush, Jr. et al. | |
| 4,729,706 A | 3/1988 | Peterson et al. | |
| 4,797,045 A | 1/1989 | Lautenschlager, Jr. et al. | |
| D302,491 S | 8/1989 | Brush, Jr. et al. | |
| 4,863,059 A | 9/1989 | Christensen | |
| 4,863,327 A | 9/1989 | Poupiter | |
| 4,867,600 A | 9/1989 | Bowman | |
| 4,883,397 A | 11/1989 | Dubost | |
| 4,897,005 A | 1/1990 | Peterson et al. | |
| 4,911,594 A | 3/1990 | Fisher | |
| 4,919,578 A | 4/1990 | Zeigler et al. | |
| 4,973,191 A | 11/1990 | Dannhauser | |
| 4,976,568 A | 12/1990 | Hess | |
| 4,998,332 A | 3/1991 | Dacey, Jr. | |
| 5,026,235 A | 6/1991 | Muller et al. | |
| 5,123,776 A | 6/1992 | Lang et al. | |
| 5,134,758 A | 8/1992 | Christensen | |
| 5,152,651 A | 10/1992 | Artéon | |
| 5,176,482 A | 1/1993 | Reinl | |
| 5,197,307 A | 3/1993 | Abbott, Jr. | |
| 5,205,668 A | 4/1993 | Adams | |
| D335,378 S | 5/1993 | Mariol | |
| 5,249,901 A | 10/1993 | Moore | |
| 5,330,303 A | 7/1994 | Dubost | |
| 5,375,940 A | 12/1994 | Kobayashi | |
| 5,378,097 A | 1/1995 | Barnavol | |
| D355,118 S | 2/1995 | Dickinson et al. | |
| D357,161 S | 4/1995 | Booten | |
| D361,511 S | 8/1995 | Dickinson et al. | |
| 5,462,383 A | 10/1995 | Van 'T Veer | |
| 5,484,076 A | 1/1996 | Petrushka | |
| D367,211 S | 2/1996 | Cautereels | |
| 5,549,411 A | 8/1996 | Hawkins | |
| D373,953 S | 9/1996 | Gale | |
| D376,693 S | 12/1996 | Wolff | |
| 5,605,353 A | 2/1997 | Moss et al. | |
| D379,138 S | 5/1997 | Carlson | |
| 5,627,340 A | 5/1997 | Smith et al. | |
| D382,112 S | 8/1997 | Egan | |
| D385,673 S | 10/1997 | Siler et al. | |
| 5,694,719 A | 12/1997 | Bejune et al. | |
| 5,697,729 A | 12/1997 | Bowman | |
| D394,550 S | 5/1998 | Tanji | |
| 5,782,584 A | 7/1998 | Arthur | |
| 5,829,215 A | 11/1998 | Billing | |
| 5,855,461 A | 1/1999 | Tripi | |
| 5,919,019 A | 7/1999 | Fischer | |
| 5,951,223 A | 9/1999 | Lindquist | |
| 5,975,323 A | 11/1999 | Turan | |
| D417,361 S | 12/1999 | Mittmann et al. | |
| 6,000,576 A | 12/1999 | Liu | |
| 6,006,414 A | 12/1999 | Corporon et al. | |
| D426,064 S | 6/2000 | Douglas et al. | |
| 6,087,582 A | 7/2000 | Arthur | |
| 6,106,207 A | 8/2000 | Kuzdak, III | |
| 6,164,885 A | 12/2000 | Roytberg et al. | |
| 6,261,039 B1 | 7/2001 | Reed | |
| 6,283,689 B1 | 9/2001 | Roytberg et al. | |
| 6,321,928 B1 | 11/2001 | Goldenstein et al. | |
| 6,371,687 B1 | 4/2002 | Heintz et al. | |
| 6,371,688 B1 | 4/2002 | Yang et al. | |
| D469,607 S | 2/2003 | Wolff | |
| D474,596 S | 5/2003 | Osiecki et al. | |
| 6,688,806 B2 | 2/2004 | Kuan | |
| 6,752,565 B2 | 6/2004 | Schrage | |
| 6,772,566 B1 | 8/2004 | Machledt et al. | |
| 6,820,760 B2 | 11/2004 | Wegner et al. | |
| 6,899,240 B2 * | 5/2005 | Dang | E03B 7/095 220/3.8 |
| 6,932,099 B2 | 8/2005 | Mahaney | |
| D510,802 S | 10/2005 | Sagol | |
| 6,992,252 B1 | 1/2006 | Rao et al. | |
| 7,009,513 B2 | 3/2006 | Dang | |
| 7,030,315 B1 | 4/2006 | Dunn et al. | |
| D531,802 S | 11/2006 | Zimmerman | |
| 7,163,352 B2 | 1/2007 | Jurich et al. | |
| 7,201,533 B2 | 4/2007 | DeGreef | |
| D547,175 S | 7/2007 | Berg | |
| D569,073 S | 5/2008 | Osiecki et al. | |
| D570,074 S | 5/2008 | Osiecki et al. | |
| D571,524 S | 6/2008 | Kang et al. | |
| 7,385,137 B2 | 6/2008 | Burke et al. | |
| D574,125 S | 7/2008 | Gunst et al. | |
| D579,625 S | 10/2008 | Kang et al. | |
| 7,467,910 B2 | 12/2008 | Lecuyer et al. | |
| 7,500,412 B1 | 3/2009 | Maciejewski | |
| 7,501,573 B2 | 3/2009 | Balfour, Jr. | |
| D590,709 S | 4/2009 | Fitzsimmons | |
| D598,197 S | 8/2009 | Ahlstrom | |
| 7,607,553 B2 | 10/2009 | Weber | |
| D606,306 S | 12/2009 | Monte | |
| 7,748,926 B2 | 7/2010 | Jurich et al. | |
| D622,061 S | 8/2010 | Higginson | |
| D624,275 S | 9/2010 | Min | |
| 7,807,923 B2 | 10/2010 | Moran | |
| 7,855,338 B2 | 12/2010 | Troder | |
| D639,065 S | 6/2011 | Duvigneau | |
| D640,138 S | 6/2011 | Lee | |
| D648,538 S | 11/2011 | Reinhart et al. | |
| 8,061,928 B2 | 11/2011 | Jurich et al. | |
| D654,693 S | 2/2012 | Freeman | |
| 8,113,740 B2 | 2/2012 | Boulton et al. | |
| D662,323 S | 6/2012 | Jurich et al. | |
| 8,242,386 B1 | 8/2012 | Baldwin et al. | |
| 8,272,528 B2 | 9/2012 | Dunn | |
| 8,302,796 B1 | 11/2012 | Johnson | |
| D682,553 S | 5/2013 | Jurich et al. | |
| 8,469,628 B2 | 6/2013 | Miller et al. | |
| D693,535 S | 11/2013 | Henderson et al. | |
| D696,526 S | 12/2013 | Christensen | |
| 8,821,062 B2 | 9/2014 | Miller et al. | |
| 8,835,757 B2 | 9/2014 | Freeman | |
| 8,921,712 B1 | 12/2014 | Gretz | |
| 8,944,266 B2 | 2/2015 | Roemer et al. | |
| D730,015 S | 5/2015 | Osiecki et al. | |
| 9,021,842 B2 | 5/2015 | Rix | |
| D731,739 S | 6/2015 | Hine et al. | |
| D732,264 S | 6/2015 | Hine et al. | |

(56) References Cited

U.S. PATENT DOCUMENTS

| | | | |
|---|---|---|---|
| D732,265 | S | 6/2015 | Osiecki et al. |
| 9,054,509 | B2 | 6/2015 | Knapp |
| 9,174,798 | B2 | 11/2015 | Freeman |
| D772,522 | S | 11/2016 | Henderson et al. |
| D799,149 | S | 10/2017 | Chafetz |
| D800,989 | S | 10/2017 | Lucido |
| D803,508 | S | 11/2017 | Horn et al. |
| D811,687 | S | 2/2018 | Kang |
| D817,589 | S | 5/2018 | Culbreth |
| 2002/0100146 | A1 | 8/2002 | Ko |
| 2003/0202857 | A1 | 10/2003 | Lowry et al. |
| 2003/0206785 | A1 | 11/2003 | Hoffmann |
| 2004/0042849 | A1 | 3/2004 | Jurich et al. |
| 2006/0088378 | A1 | 4/2006 | Pendleton et al. |
| 2007/0194493 | A1 | 8/2007 | Jurich et al. |
| 2008/0095592 | A1 | 4/2008 | Spitz |
| 2008/0159824 | A1 | 7/2008 | Okada et al. |
| 2008/0169392 | A1 | 7/2008 | McClure et al. |
| 2008/0226417 | A1 | 9/2008 | Spitz |
| 2008/0247842 | A1 | 10/2008 | Motsch et al. |
| 2008/0310931 | A1* | 12/2008 | Csik ............... F16B 37/043 411/103 |
| 2009/0087279 | A1 | 4/2009 | McGinn et al. |
| 2009/0226260 | A1 | 9/2009 | Boulton et al. |
| 2010/0040433 | A1 | 2/2010 | Poppe et al. |
| 2010/0132168 | A1 | 6/2010 | Coffland et al. |
| 2010/0296865 | A1 | 11/2010 | Jurich et al. |
| 2010/0310338 | A1 | 12/2010 | Diez Herrera |
| 2010/0329782 | A1 | 12/2010 | Miller et al. |
| 2011/0290802 | A1 | 12/2011 | Burros |
| 2012/0073106 | A1 | 3/2012 | Jurich et al. |
| 2012/0228302 | A1 | 9/2012 | Byrns |
| 2013/0248534 | A1 | 9/2013 | Dang |
| 2013/0263425 | A1 | 10/2013 | Miller et al. |
| 2016/0046440 | A1 | 2/2016 | Freeman |
| 2017/0166368 | A1 | 6/2017 | Freeman |

FOREIGN PATENT DOCUMENTS

| | | |
|---|---|---|
| EP | 0390767 | 10/1990 |
| EP | 0529178 | 3/1993 |
| EP | 1004709 | 5/2000 |
| FR | 2760765 | 9/1998 |
| FR | 2890671 | 3/2007 |
| GB | 2175630 | 12/1986 |
| GB | 2207164 | 1/1989 |
| GB | 2276405 | 9/1994 |
| GB | 2378971 | 2/2003 |
| GB | 2390629 | 1/2004 |
| WO | WO 98/53151 | 11/1998 |

OTHER PUBLICATIONS

"Grade Ring with Installation Kit," Oldcastle Precast, 2008, 2 pages.
"Series 36 Pull Box," Oldcastle Precast, 2002, 2 pages.
"Series 38 Pull Box," Oldcastle Precast, 2002, 2 pages.
"Series 66 Pull Box," Oldcastle Precast, 2002, 2 pages.
"Underground Enclosure with Fastener," date unknown, 2 pages.
"Western Underground Committee Guide 3.6," Western Underground, date unknown, 14 pages.
U.S. Appl. No. 85/272,635, filed Mar. 21, 2011; Reg. No. 4,204,420, issued Sep. 11, 2012, 2 pages.
U.S. Appl. No. 85/272,629, filed Mar. 2, 2011; Reg. No. 4,204,419, issued Sep. 11, 2012, 2 pages.
Brooks Products Meter Boxes and Pull Boxes, drawing revision date Dec. 6, 2000, 17 pages.
Brooks Products Meter Boxes and Pull Boxes, drawing revision date Jan. 9, 2001, 4 pages.
Applicant's Admitted Prior Art: Eisel Enterprises Inc. Precast Concrete Products, date unknown, 21 pages.
Applicant's Admitted Prior Art: US Concrete Precast Group Products, date unknown, 9 pages.
Official Action for U.S. Appl. No. 13/294,054, dated Feb. 27, 2014 11 pages.
Notice of Allowance for U.S. Appl. No. 13/294,054, dated Jun. 23, 2014 7 pages.
Official Action for U.S. Appl. No. 14/486,662, dated Mar. 27, 2015 7 pages.
Notice of Allowance for U.S. Appl. No. 14/486,662, dated Jul. 8, 2015 9 pages.
Official Action for U.S. Appl. No. 13/851,809, dated Mar. 27, 2015 7 pages.
Official Action for U.S. Appl. No. 13/851,809, dated Sep. 17, 2015 12 pages.
Notice of Allowance for U.S. Appl. No. 13/851,809, dated Jan. 22, 2016 9 pages.
Notice of Allowance for Design U.S. Appl. No. 29/386,380, dated Feb. 29, 2012, 9 pages.
Official Action for Design U.S. Appl. No. 29/424,306, dated Sep. 13, 2012, 7 pages.
Notice of Allowance for Design U.S. Appl. No. 29/424,306, dated Jan. 7, 2013, 5 pages.
Notice of Allowance for Design U.S. Appl. No. 29/378,870, dated Nov. 4, 2011, 9 pages.
U.S. Appl. No. 29/618,330, Freeman et al.
Notice of Allowance for U.S. Appl. No. 14/925,561, dated Nov. 15, 2017 7 pages.
Notice of Allowance for U.S. Appl. No. 15/446,400, dated Nov. 21, 2017 9 pages.
Official Action (Restriction Requirement) for U.S. Appl. No. 15/257,041, dated Feb. 8, 2018 6 pages.
"13 x 24 Series Box & Cover," cdr Systems Corp., 1996, 1 page.
"1324 Grade Ring, HDPE, Green," Oldcastle Precast, Inc., 2008, 2 pages.
"1324-12 Body Fibrelyte 2x Floating Nut Provision," Oldcastle Precast, Inc., 2010, 5 pages.
17 x 30 Flared Wall Series, Box, Cover & Extension, cdr Systems Corp., 2002, 1 page.
17 x 30 Straight Wall Series, Box & Cover, cdr Systems Corp., 2002, 1 page.
"6-inch Standard Extension," Oldcastle Precast, Inc., 2009, 1 page.
"Body, 1730-24, HDPE, Green, Split-Cover Prov.," Carson Industries LLC (now Oldcastle Precast), 2004, 1 page.
"Caltrans Revised Standard Plans," California Department of Transportation, 2004, Part 1, 34 pages.
"Caltrans Revised Standard Plans," California Department of Transportation, 2004, Part 2, 35 pages100 pages.
"Caltrans Revised Standard Plans," California Department of Transportation, 2004, Part 3, 31 pages.
"Concrete Products Catalog," Oldcastle Precast, Inc., 2009, 90 pages.
"Concrete Products, Inc. Catalog," Christy Concrete Products (now Oldcastle Precast, Inc.), 1999, 5 pages.
"Dry Utilities Polymer and Plastic Products Catalog," Oldcastle Precast, Inc., 2003, Part I, 63 pages.
"Dry Utilities Polymer and Plastic Products Catalog," Oldcastle Precast, Inc, 2003, Part II, 73 pages.
"Dry Utilities Polymer and Plastic Products Catalog," Oldcastle Precast, Inc., 2009, Part I, 79 pages.
"Dry Utilities Polymer and Plastic Products Catalog," Oldcastle Precast, Inc., 2009, Part II, 81 pages.
"Enclosure Solutions for Fiber & Copper Cable," Oldcastle Precast, 2009, 8 pages.
"F12 Fiberlyte," Christy Concrete, 2003, 1 page.
"SA32-1324-24 Box & Cover Assembly," cdr Systems Corp, 1991, 1 page.
"Secondary Enclosures for Electric Underground," PG&E, 2009, 15 pages.
Specifications for Commercial Construction, Roseville Electric, 2000, 3 pages.
"Super Jumbo XL," Oldcastle Precast, Inc., 2009, 2 pages.
"Super Jumbo," Oldcastle Precast, Inc., 2009, 2 pages.
"Syn1730D Polymer Concrete Lid," Oldcastle Precast, Inc., 2008, 1 page.
"Telephone Electric CATV," Pencell Plastics, Inc., 2007, 4 pages.

(56) References Cited

OTHER PUBLICATIONS

"Underground Enclosures and Pads," Quazite, Hubbell Lenoir City, Inc., 2009, 107 pages.
Utility Infrastructure Price List, Carson Industries LLC, 2005, 18 pages.
Manning et al., "Tourist's Death on Strip Worries County," Las Vega Sun, 2003, 2 pages.
Stephens, "Handholes and Underground Electrical Enclosures," NEC Digest, Strongwell Corp., 2005, 10 pages.
Final Action for U.S. Appl. No. 14/925,561, dated Dec. 23, 2016, 10 pages.
Notice of Allowance for U.S. Appl. No. 14/925,561, dated Jun. 1, 2017, 7 pages.
Official Action for U.S. Appl. No. 15/446,400, dated May 19, 2017 11 pages.
Official Action for U.S. Appl. No. 29/618,330, dated Jun. 15, 2018, 8 pages. Restriction Requirement.
Official Action for U.S. Appl. No. 15/257,041, dated May 24, 2018, 8 pages.
Official Action for U.S. Appl. No. 14/486,662, dated Mar. 14, 2016 14 pages.

\* cited by examiner

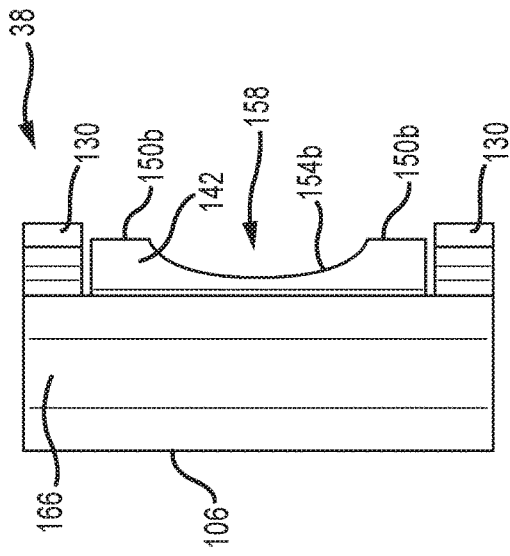
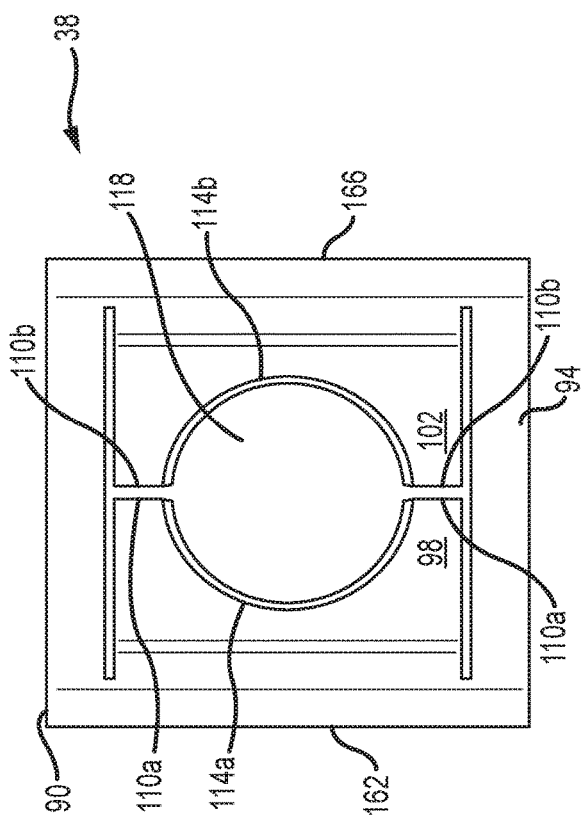
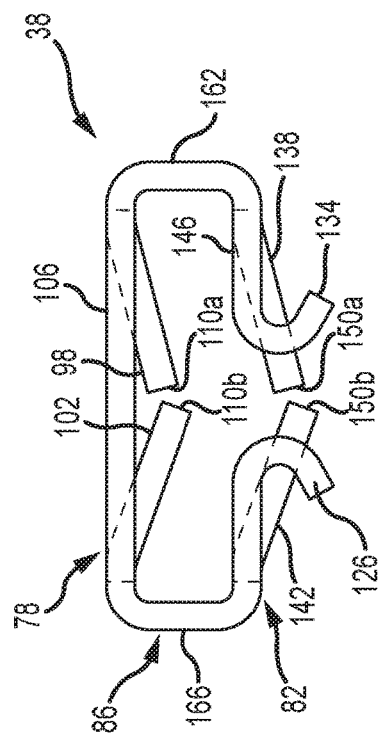
FIG. 11
FIG. 9
FIG. 10

TAMPER RESISTANT CLOSURE MECHANISM FOR A UTILITY VAULT

This Non-Provisional application is a Continuation-in-Part of U.S. patent application Ser. No. 13/851,809, filed Mar. 27, 2013, which claims the benefit of priority from U.S. Provisional Patent Application No. 61/616,125, filed Mar. 27, 2012, and is also a Continuation-in-Part of U.S. patent application Ser. No. 13/294,054, filed Nov. 10, 2011, the entire disclosures of which are hereby incorporated by reference in their entirety.

FIELD

The present disclosure generally relates to attachment hardware, and more specifically to fasteners for securing components. A floating nut cage specifically adapted for holding a nut and preventing rotation during use are provided.

BACKGROUND

Subgrade vaults are widely used to house underground connections of electrical cables and water lines. The following references relate to the field of subgrade storage vaults and facilities and are hereby incorporated by reference herein in their entireties: U.S. Pat. No. 4,567,697; U.S. Pat. No. 6,772,566; U.S. Pat. No. 6,899,240; U.S. Pat. No. 7,163,352; U.S. Pat. No. 7,385,137; U.S. Pat. No. 7,467,910; and U.S. Pat. No. 7,748,926. In part due to the high commodity prices of metals and other internal components, theft is an increasing problem which results in expensive replacement costs and extensive periods of downtime, including interruptions in communication, electrical, and/or water service. In response to the increasing theft rate, lockable lids have been utilized in connection with the subgrade vaults to prevent unauthorized access to the contents of the vaults.

The lockable vaults generally utilize an externally-threaded bolt and a corresponding internally-threaded nut. The lockable vaults have been useful in preventing theft. However, the lockable vaults have created problems for authorized individuals who need access to the vault contents. For example, in many situations, the threaded bolt becomes stuck, seized, rusted, corroded, or otherwise impossible to remove from the lockable vault. In these situations, the authorized individual spends vast amounts of time trying to remove the vault lid to access the vault's contents. In many circumstances, the lid is destroyed in an attempt to remove the bolt.

Thus, it is desirable to provide a nut configured for threadably engaging a threaded bolt that reduces the galling, sticking, seizing, rusting, corrosion, and other common issues that increase the difficulty of removing a bolt from a nut. Although the aforementioned problems have been discussed in particular to subgrade vaults, it should be appreciated that the nut of the present disclosure can be utilized in applications beyond subgrade vaults.

SUMMARY

The present disclosure is generally directed to systems and methods which provide a double-thread speed nut. It is one aspect of the present disclosure to provide a nut with an increased torque capability. In one embodiment, a nut comprises an upper portion that defines a first thread, a lower portion that defines a second thread, and a sidewall portion that connects the first thread and the second thread. The first thread and the second thread together form a double thread. Generally, the addition of the second thread increases the torque capability of the nut.

In various embodiments, features of the present invention are contemplated as being provided with or useful for securing a utility vault, such as a sub-grade utility vault with a cap and a lid. U.S. Patent Application Publication No. 2012/0111866 filed Nov. 10, 2011 relates to such vaults and enclosures and is hereby incorporated by reference in its entirety.

It is another aspect of the present disclosure to provide a nut that reduces the galling, sticking, seizing, rusting, corrosion, and/or other common issues that increase the difficulty of removing a bolt from a nut. In one embodiment, a nut comprises an upper portion that defines a first thread, a lower portion that defines a second thread, and a sidewall portion that connects the first thread and the second thread. The upper portion is spaced apart from the lower portion by a gap, and the sidewall portion comprises a first sidewall spaced apart from a second sidewall. The gap between the upper portion and the lower portion, along with the open sidewall portion, provides an exit path for dirt and/or debris lodged within the nut. Removal of the dirt and/or debris reduces the likelihood of rusting and/or corrosion. In addition, dirt and/or debris removal reduces heat generation during engagement of a bolt and the nut, thereby reducing the likelihood of galling, sticking, and/or seizing.

It is another aspect of the present disclosure to provide a nut that can act as a substitute for other types of nuts. In one embodiment, a nut is provided that can function as a substitute for a square nut. For example, in one configuration, a nut can be manufactured to match any size of square nut, including height, width, and length.

It is yet another aspect of the present disclosure to provide a method of manufacturing a nut. In one embodiment, a substantially planar strip of material having a first end, a second end, a first side, and a second side is utilized. A first aperture is formed near the center of the strip, and an arcuate portion is formed near the first end and the second end of the strip. The first end and the second end of the strip are folded, or bent, downward relative to the planar strip to define a first sidewall and a second sidewall. The first end and the second end of the strip are further folded, or bent, relative to the first sidewall and the second sidewall, respectively, so that the arcuate portion associated with the first end of the strip opposes the arcuate portion associated with the second end of the strip to define a second aperture that is axially aligned with the first aperture. In this fashion, a nut having a double thread can be formed from a unitary strip of material.

It is yet a further aspect of the present disclosure to provide a nut constructed of materials now known or later developed in the art. In one embodiment, a nut is constructed of a metallic or a non-metallic material. For example, a metallic nut may be constructed of, but is not limited to, aluminum, brass, copper, nickel, steel, titanium, zinc, and various alloys constructed thereof, e.g., stainless steel. As another example, a non-metallic nut may be constructed of, but is not limited to, various plastics including, but not limited to, acetal, fiberglass, nylon, polyether ether ketone (PEEK), polycarbonate, polypropylene, polytetrafluoroethylene (PTFE), and polyvinylchloride (PVC). In another embodiment, a nut may include a finish. A finish may include, but is not limited to, armor coating with silver-gray polymer, blackening with black luster or black oxide, cadmium plating, hot-dipped galvanizing, PTFE coating, or zinc plating.

It is another aspect of the present disclosure to provide a tamper resistance closure mechanism for selectively securing a lid to a utility vault, the mechanism including a utility vault having a plurality of sidewalls and an opening, a cap operably engaged to an opening of the utility vault and including recessed lip, a lid sized to rest on the lip with the lid and having a perimeter entirely positioned within the interior edge of the cap, a locking assembly interconnected to the cap, the locking assembly comprising an upper planar member having a first aperture configured to receive a bolt, and an angled portion, wherein the angled portion extends downward and further includes a second aperture, a middle planar member spaced apart from the upper planar member by a gap, the middle planar member comprising a third aperture, and a lower portion having at least a base and sidewalls and spaced apart from the middle planar member by a second gap, the lower portion further having a fourth aperture and is adapted to house a nut.

It is yet another aspect of the present disclosure to provide a locking assembly for use in a utility vault including an upper planar member having a first aperture configured to receive a bolt, and an angled portion, wherein the angled portion extends downward and further including a second aperture, a middle planar member spaced apart from the upper portion by a gap, the middle portion comprising a third aperture, and a lower portion comprising at least a base and sidewalls, the lower portion spaced apart from the middle portion by a second gap, the lower portion further having a fourth aperture and being adapted to house a nut.

It is another aspect of the present disclosure to provide a locking assembly for use in a utility vault including a lower portion, the lower portion comprising a base and sidewalls, the base further having a first aperture, a middle planar member spaced apart from the lower portion by a gap and having a second aperture, the middle planar portion connected to one of the lower portion sidewalls by a first arcuate connection, and a top planar member spaced apart from the middle planar member by a second gap, the top planar member connected to one of the lower portion sidewalls by a second arcuate connection, the top planar member further having an angled portion extending downward into the second gap and comprising a third aperture, wherein the first, second, and third aperture are aligned along a central axis.

Various embodiments of the present invention contemplate accommodating torque values up to approximately 70 ft-lbs. It will be recognized, however, that maximum or recommended torque values for embodiments of the present invention will vary based on associated materials, such as the material of an associated utility vault cover. In various embodiments, maximum recommended torque values are between approximately 5 ft-lbs and 70 ft-lbs. In certain embodiments, approximately 27 ft-lbs is provided as a recommended maximum torque value.

As used herein, a "bolt" generally describes a fastener with a threaded shank intended to be used with a nut to clamp an assembly together. The same type of fastener is generally referred to as a screw when it is threaded into a hole rather than used with a nut. In addition, as used herein, the terms "first", "second", "third", and "fourth" are not intended to connote importance or priority, but are used to distinguish one feature from another. Further, as used herein, the terms "upper", "lower", "side", "vertical", and "horizontal" are not intended to limit a feature to a particular orientation. Rather, the aforementioned terms are utilized for convenience, and the nut disclosed herein can be positioned in a variety of orientations for use.

The phrases "at least one", "one or more", and "and/or", as used herein, are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity, as used herein, refers to one or more of that entity. As such, the terms "a" (or "an"), "one or more" and "at least one" can be used interchangeably herein.

The use of "including," "comprising," or "having" and variations thereof herein is meant to encompass the items listed thereafter and equivalents thereof as well as additional items. Accordingly, the terms "including," "comprising," or "having" and variations thereof can be used interchangeably herein.

It shall be understood that the term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the invention, brief description of the drawings, detailed description, abstract, and claims themselves.

The Summary is neither intended nor should it be construed as being representative of the full extent and scope of the present disclosure. The present disclosure is set forth in various levels of detail in the Summary as well as in the attached drawings and the Detailed Description and no limitation as to the scope of the claimed subject matter is intended by either the inclusion or non-inclusion of elements, components, etc. in this Summary. Moreover, reference made herein to "the present invention" or aspects thereof should be understood to mean certain embodiments of the present disclosure and should not necessarily be construed as limiting all embodiments to a particular description.

BRIEF DESCRIPTION OF THE DRAWINGS

The accompanying drawings, which are incorporated in and constitute a part of the specification, illustrate embodiments of the disclosure and together with the general description given above and the detailed description of the drawings given below, serve to explain the principles of these embodiments.

FIG. 9 is a top plan view of the double-thread speed nut shown in FIG. 7;

FIG. 10 is a back elevation view of the double-thread speed nut shown in FIG. 9;

FIG. 11 is a right side view of the double-thread speed nut shown in FIG. 9;

Figure 1:
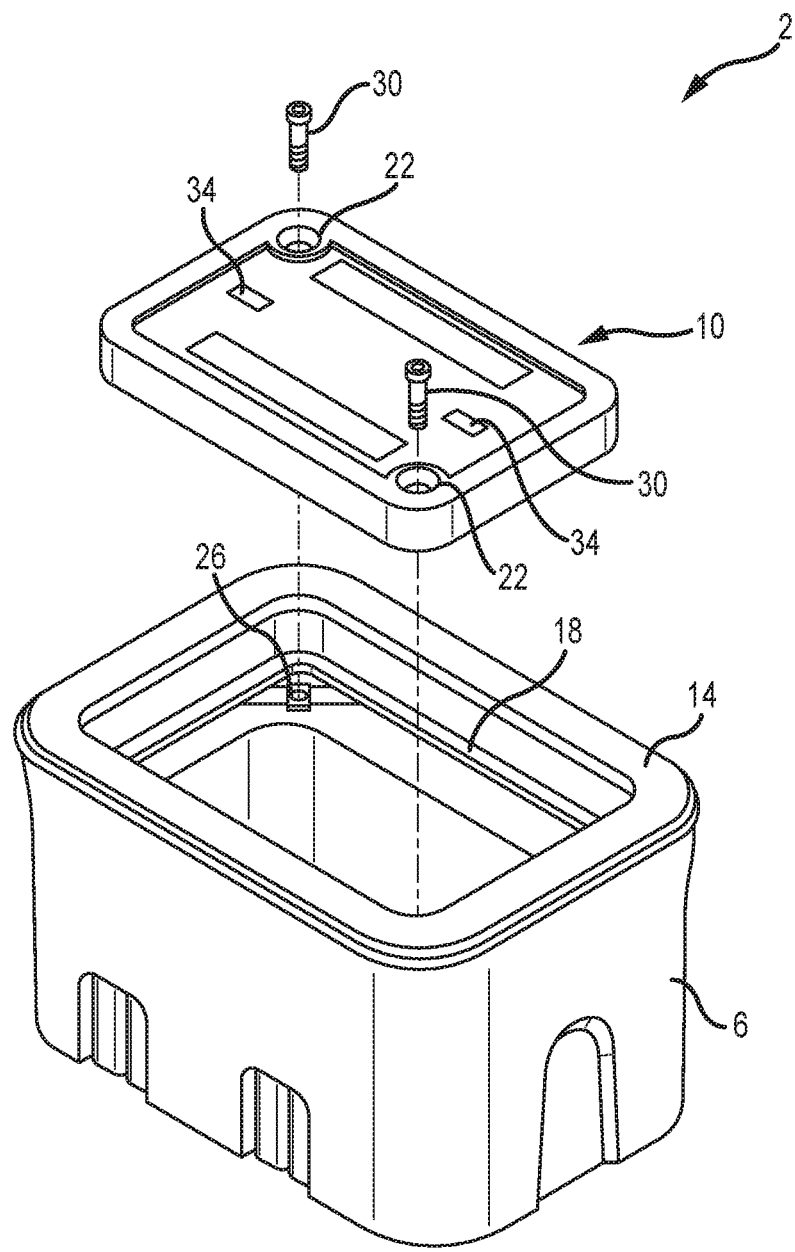
FIG. 1 is a front perspective view of a prior art subgrade vault.

It should be understood that the drawings are not necessarily to scale. In certain instances, details that are not necessary for an understanding of the disclosure or that render other details difficult to perceive may have been omitted. It should be understood, of course, that the claimed subject matter is not necessarily limited to the particular embodiments illustrated herein.

To assist in the understanding of the drawings, the following is a list of components and associated numbering found in the drawings:

| # | Components |
|---|---|
| 2 | Subgrade vault |
| 6 | Main body portion |
| 10 | Lid |
| 14 | Cap |
| 18 | Shelf portion |
| 22 | Aperture |
| 26 | Clip nut |
| 30 | Bolt |
| 34 | Lift interface |
| 38 | Double-thread speed nut |
| 42 | Nut receptacle |
| 46 | Shoulder |
| 50 | Recessed region |
| 54 | Nut retainer |
| 58 | Fastener |
| 62 | External thread |
| 66 | UNC thread bolt |
| 70 | Coil-thread bolt |
| 74 | Lag, or auger, bolt |
| 78 | Upper portion (of double-thread speed nut) |
| 82 | Lower portion (of double-thread speed nut) |
| 86 | Sidewall portion (of double-thread speed nut) |
| 90 | First bridge (of upper portion) |
| 94 | Second bridge (of upper portion) |
| 98 | First upper portion plate (or third plate) |
| 102 | Second upper portion plate (or fourth plate) |
| 106 | Upper surface (of upper portion) |
| 110a | Leading edge (of first upper portion plate) |
| 110b | Leading edge (of second upper portion plate) |
| 114a | Arcuate portion (of first upper portion plate) |
| 114b | Arcuate portion (of second upper portion plate) |
| 118 | Upper portion aperture (or first aperture) |
| 122 | First foot segment |
| 126 | Second foot segment |
| 130 | Third foot segment |
| 134 | Fourth foot segment |
| 138 | First lower portion plate (or first plate) |
| 142 | Second lower portion plate (or second plate) |
| 146 | Upper surface (of lower portion) |
| 150a | Leading edge (of first lower portion plate) |
| 150b | Leading edge (of second lower portion plate) |
| 154a | Arcuate portion (of first lower portion plate) |
| 154b | Arcuate portion (of second lower portion plate) |
| 158 | Lower portion aperture (or second aperture) |
| 162 | First sidewall (of sidewall portion) |
| 166 | Second sidewall (of sidewall portion) |
| 170 | Strip |
| 174 | First end (of strip) |
| 178 | Second end (of strip) |
| 182 | First side (of strip) |
| 186 | Second side (of strip) |
| 200 | Nut |
| 202 | First member |
| 204 | Second member |
| 206 | First bridge |
| 208 | Second bridge |
| 210 | Upper portion |
| 212 | Aperture |
| 214 | First downwardly sloping feature |
| 216 | Second downwardly sloping feature |
| 218 | First bridge member |
| 220 | Second bridge member |
| 222 | Aperture |
| 224 | First downwardly sloping feature |
| 226 | Second downwardly sloping feature |
| 228 | Upper surface |
| 230 | Width |
| 232 | Gap |
| 234 | Height |
| 236 | Tolerance |
| 300 | Bolt |
| 302 | Bracket |
| 304 | Extension Member |
| 306 | Aperture |
| 308 | Peripheral Portion |
| 310 | Through-hole |
| 312 | Floating nut cage |
| 314 | Upper portion |
| 316 | Lower portion |

-continued

| # | Components |
|---|---|
| 318 | First plate |
| 320 | Second plate |
| 322 | Cage |
| 324 | First gap |
| 326 | Second gap |
| 328 | Plane |
| 330 | First aperture |
| 332 | Second aperture |
| 334 | Third aperture |
| 336 | Base |
| 338 | First sidewall |
| 340 | Second sidewall |
| 342 | First arcuate portion |
| 344 | Second arcuate portion |
| 346 | Cut out portion |
| 348 | Nut |
| 350 | Corner bracket |
| 352 | Large aperture |
| 354 | Small aperture |
| 356 | Bolt |
| 358 | Bolt head |
| 360 | Bolt thread |
| 362 | Floating nut plate |
| 364 | Large aperture |
| 366 | Small aperture |

DETAILED DESCRIPTION

With reference to FIG. 1, a subgrade vault 2, which is known in the art, is depicted. The subgrade vault 2 includes a main body portion 6 and a lid 10. The main body portion 6 includes four sidewalls and is generally open at a top and a bottom. The main body portion 6 may be constructed of a concrete material, a polymer, combinations thereof, or any other materials now known or later developed in the art. A cap 14 may be connected to the top of the main body portion 6.

Typically, the lid 10 is sized to rest upon a shelf portion 18, which is interconnected to the main body portion 6 of the subgrade vault 2, such that an upper surface of the lid 10 is generally flush with an upper surface of the cap 14 when the lid 10 is in a closed position. The lid 10 is provided with at least one aperture 22 that aligns with a clip nut 26 when the lid 10 is in a closed position. Thus, at least one bolt 30 may be placed through the at least one aperture 22 of the lid 10 and threadably engage the clip nut 26 to lock the lid in place. A tamper-proof or tamper-resistant bolt 30 may be utilized to protect the contents of the subgrade vault 2 from those lacking proper tools (e.g., specialty tools).

Although not shown in FIG. 1, selectively removable caps or covers may be provided to protect the at least one bolt 30 from the elements, render them less obvious to potential trespassers, and/or create a more uniform and aesthetically pleasing upper portion of the lid 10. In addition, a lid 10 may comprise at least one lift interface 34 for providing a point of attachment for various devices designed to lift or displace the lid. Lift interfaces 34 may comprise a recess having a rigid member or post adapted for grasping or communicating with a lifting device comprising a hook, as will be recognized by one of ordinary skill in the art.

Figure 3:
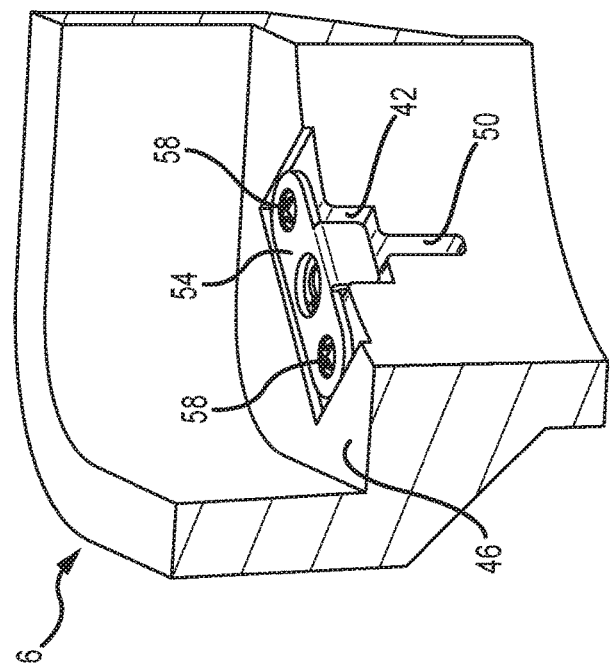
FIG. 3 is a perspective view of the double-thread speed nut shown in FIG. 2 retained in a receptacle formed in a main body portion of a subgrade vault.
Figure 2:
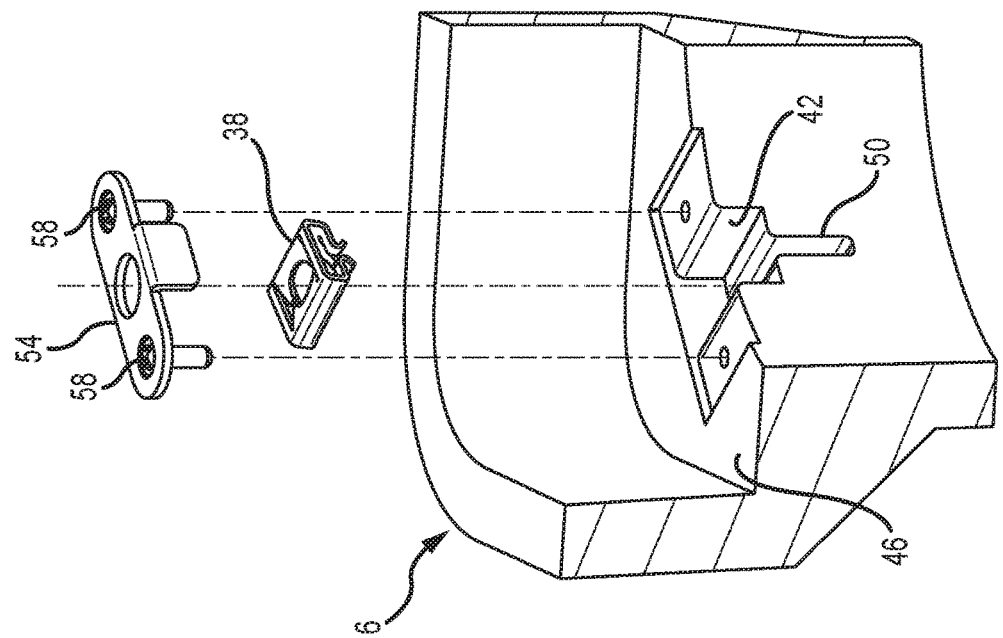
FIG. 2 is a partially fragmented exploded perspective view of one embodiment of a double-thread speed nut being utilized with a subgrade vault.

Referring to FIG. 2 and FIG. 3, one embodiment of a double-thread speed nut 38 being utilized with a main body portion 6 of a subgrade vault 2 is provided. The main body portion 6 depicted in FIGS. 2-3 is slightly modified from the main body portion depicted in FIG. 1. As illustrated in FIGS. 2-3, the main body portion 6 includes a nut receptacle 42 formed in a shoulder 46. A recessed region 50 is formed below the nut receptacle 42 and is configured to accommodate a portion of a bolt. For example, the recessed region 50 may include a central opening configured to receive a bolt shank and a slot configured to accommodate the egress of dirt and/or debris. To assemble the unit, the double-thread speed nut 38 is placed in the nut receptacle 42, the nut retainer 54 is positioned over the double-thread speed nut 38, and the nut retainer 54 is secured to the main body portion 6 with fasteners 58. In one embodiment, the double-thread speed nut 38 floats in the space defined by the nut receptacle 42 and the nut retainer 54. The floating capability allows the double-thread speed nut 38 to move within the nut receptacle 42 to accommodate variations in bolt and/or lid 10 sizes. In one embodiment, the double-thread speed nut 38 includes feet configured to allow the nut 38 to float within the nut receptacle 42. For example, in one configuration, the feet are spaced apart from each other a predetermined distance to prevent a foot from entering the recessed region 50. In addition, in one configuration, the feet provide clearance for a second thread to prevent the second thread from contacting a surface of the nut receptacle 42. In another configuration, the feet may be configured to alter the height of the double-thread speed nut 38. For example, the feet may be configured to alter the height of the double-thread speed nut 38 to match a height of a square nut. In one embodiment, the double-thread speed nut 38 is rectangular to prevent the nut 38 from spinning within the nut receptacle 42. For example, in one configuration, the double-thread speed nut 38 has a generally rectangular geometry. After the double-thread speed nut 38 is secured in the nut receptacle 42, a lid 10 may be positioned on the shoulder 42 and fastened to the main body portion 6 of the subgrade vault 2 with a bolt 30 that threadably engages the double-thread speed nut 38.

Figure 6:
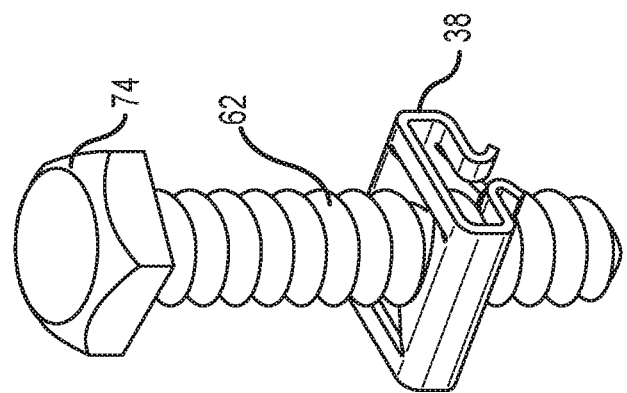
FIG. 6 is a front perspective view of the double-thread speed nut shown in FIG. 4 threadably engaged with a coil thread bolt.
Figure 5:
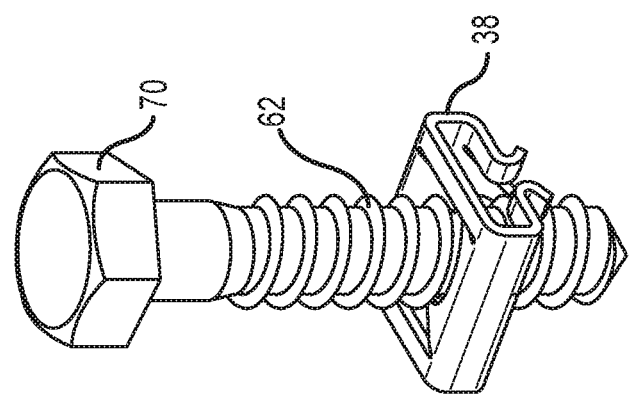
FIG. 5 is a front perspective view of the double-thread speed nut shown in FIG. 4 threadably engaged with an auger bolt.
Figure 4:
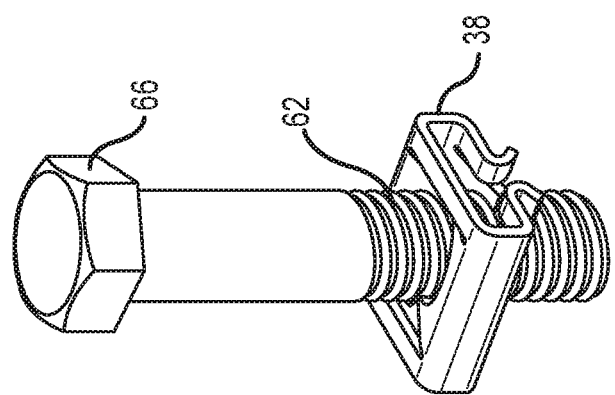
FIG. 4 is a front perspective view of one embodiment of a double-thread speed nut threadably engaged with a UNC bolt.
Figure 7:
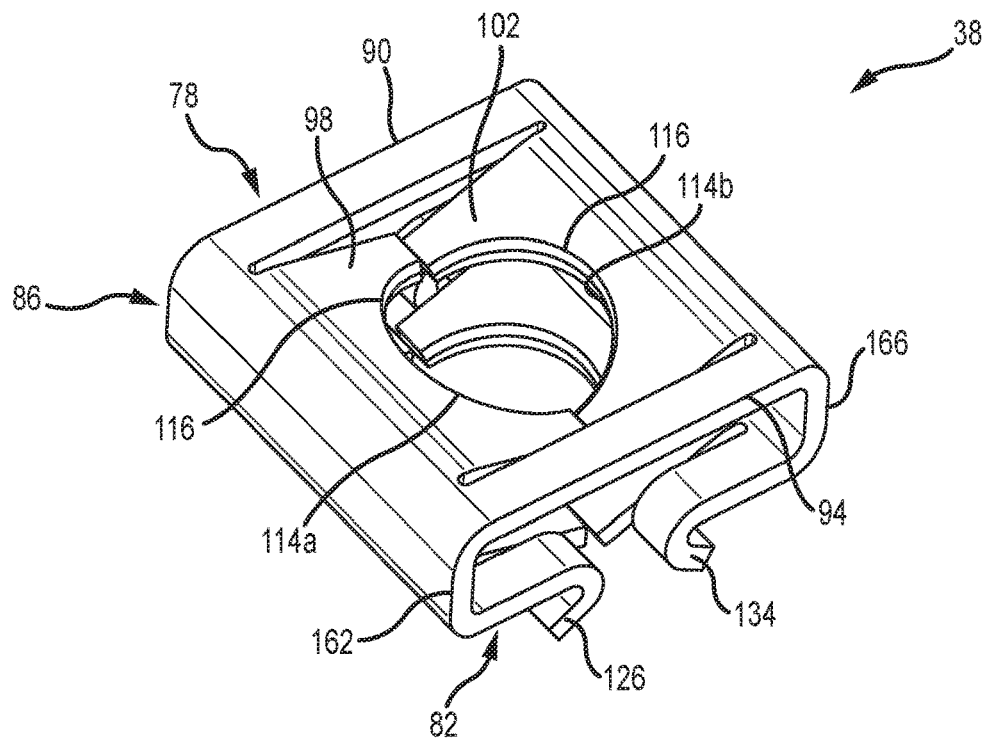
FIG. 7 is a front top perspective view of one embodiment of a double-thread speed nut.
Figure 8:
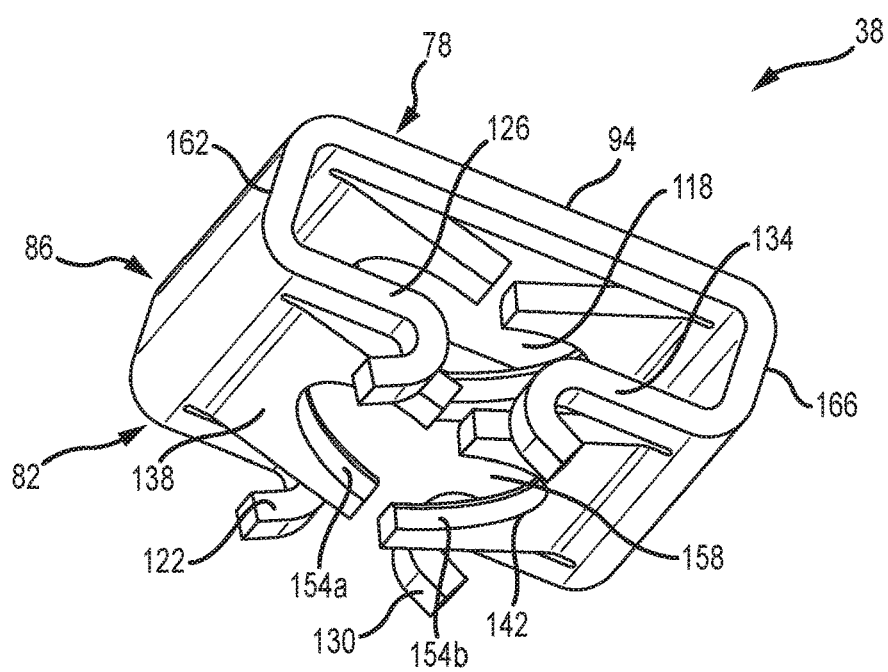
FIG. 8 is a front bottom perspective view of the double-thread speed nut shown in FIG. 7.
Figure 12:
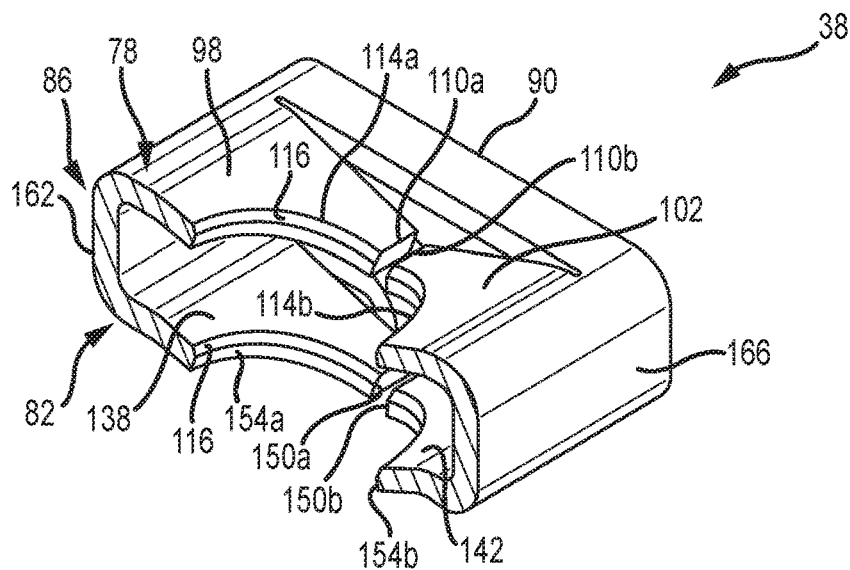
FIG. 12 is a front perspective cross-sectional view of the double-thread speed nut shown in FIG. 9 taken along line A-A of FIG. 9.
Figure 13:
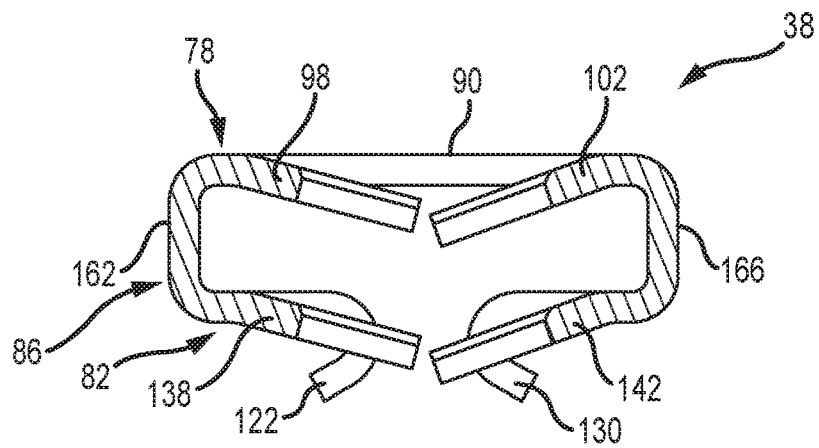
FIG. 13 is a front elevation cross-sectional view of the double-thread speed nut shown in FIG. 9 taken along line A-A of FIG. 9.
Figure 14:
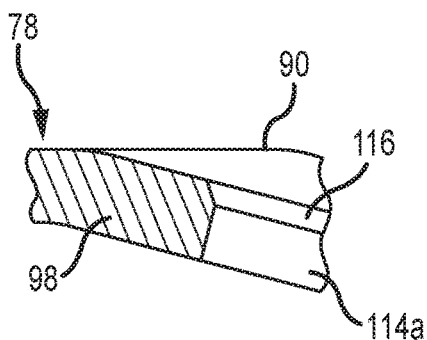
FIG. 14 is a front elevation detail view of Detail B of FIG. 13.

FIGS. 4-6 depict one embodiment of a double-thread speed nut 38 threadably engaged with three different types of bolts each having an external thread 62. FIGS. 4-6 depict a double-thread speed nut 38 threadably engaged with a UNC thread bolt 66, a coil-thread bolt 70, and a lag, or auger, bolt 74, respectfully. FIGS. 4-6 generally depict the versatility of one embodiment of a double-thread speed nut 38. For example, in one configuration, a double-thread speed nut 38 is configured to threadably engage a ½-13 UNC thread bolt, a ½-6 coil-thread bolt, and a ½" lag, or auger, bolt. Also, as depicted, the double-thread speed nut 38 can accommodate a right-hand and a left-hand thread. Moreover, as should be appreciated, the dimensions of the double-thread speed nut 38 can be altered to accommodate any bolt, including any thread. As illustrated in FIGS. 4-6, in one embodiment the double-thread speed nut 38 has a square geometry.

FIGS. 7-14 illustrate one embodiment of a double-thread speed nut 38. As illustrated, the double-thread speed nut 38 includes an upper portion 78, a lower portion 82 spaced apart from the upper portion 78 by a gap, and a sidewall portion 86 integrally connecting the upper portion 78 and the lower portion 82.

As depicted, the upper portion 78 comprises a first bridge 90, a second bridge 94, a first upper portion plate 98, and a second upper portion plate 102. Generally, the first upper portion plate 98 and the second upper portion plate 102 oppose each other and are positioned between the first bridge 90 and the second bridge 94. The first bridge 90 and the second bridge 94 generally protect the first upper portion plate 98 and the second upper portion plate 102. For example, the first bridge 90 and the second bridge 94 protect the upper plates from side impact. In one embodiment, the first bridge 90 and the second bridge 94 are substantially parallel to each other.

Further, as depicted, the first upper portion plate 98 and the second upper portion plate 102 are downwardly oriented from an upper surface 106 of the upper portion 78 and are substantially planar. The first upper portion plate 98 includes a leading edge 110a that has an arcuate portion 114a configured to matingly engage an external thread of a bolt, and the second upper portion plate 102 includes a leading edge 110b that has an arcuate portion 114b configured to matingly engage an external thread of a bolt. The arcuate portions 114a, 114b have a thickness that is less than the pitch of an external thread of a preselected bolt, and the arcuate portions 114a, 114b may include at least one chamfered edge 116 that corresponds to the angle of the external thread of the preselected bolt.

The arcuate portions 114a, 114b generally define an upper portion aperture 118 configured to receive the preselected bolt. For example, the upper portion aperture 118 generally has a diameter that is greater than a minor diameter, but smaller than a major diameter, of a preselected externally-threaded bolt. Thus, when a bolt is threaded into the upper portion 78 of the double-thread speed nut 38, the external thread of the bolt is threaded between the leading edges 110a, 110b of the first upper portion plate 98 and the second upper portion plate 102. The arcuate portion 114a will engage the external thread of the bolt on one side of the preselected bolt, and the arcuate portion 114b will engage the external thread of the bolt on an opposing side of the preselected bolt. The first upper portion plate 98 and the second upper portion plate 102 may elastically deform to allow the leading edges 110a, 110b and the arcuate portions 114a, 114b to conform to the helix of the external thread of the preselected bolt. In addition, the first upper portion plate 98 and the second upper portion plate 102 may elastically deform upward upon tightening of the bolt. The upward deformation of the first upper portion plate 98 and the second upper portion plate 102 may decrease the distance between the arcuate portions 114a, 114b, thereby reducing the diameter of the upper portion aperture 118 to a distance in which the arcuate portions 114a, 114b may squeeze the shank and/or external thread of the bolt. As should be appreciated by one of skill in the art, a given configuration of the first upper portion plate 98 and the second upper portion plate 102 may be able to accommodate more than one type of bolt.

In an alternative embodiment, the upper portion 78 may comprise only one downwardly oriented substantially planar plate. In this embodiment, an aperture may be formed entirely within the single downwardly oriented substantially planar plate and configured to receive an externally-threaded bolt. An example of this alternative upper portion plate is described in U.S. Pat. No. 6,899,240, which is hereby incorporated herein by reference in its entirety. The downwardly oriented substantially planar plate described in U.S. Pat. No. 6,899,240 is identified as a retainer.

Referring back to FIGS. 7-14, a lower portion 82 is spaced apart from the upper portion 78 by a gap. The lower portion 82 comprises a first foot segment 122, a second foot segment 126, a third foot segment 130, a fourth foot segment 134, a first lower portion plate 138, and a second lower portion plate 142. Generally, the first lower portion plate 138 opposes the second lower portion plate 142. The first lower portion plate 138 is positioned between the first foot segment 122 and the second foot segment 126, and the second lower portion plate 142 is positioned between the third foot segment 130 and the fourth foot segment 134. The feet segments generally protect the first lower portion plate 138 and the second lower portion plate 142. For example, the feet segments protect the lower plates from side impact. As another example, the feet segments may be configured to elevate the lower plates above a surface to prevent the lower plates from being bent upward. In addition, the feet segments may be configured to provide stability to, or prevent rocking of, the nut when the nut is positioned in a horizontal orientation. Further, if the nut 38 is utilized in association with a subgrade vault 2 as depicted in FIGS. 2-3, the feet segments may be configured to prevent the nut 38 from entering the recessed region 50. Moreover, in one embodiment, the feet segments may be configured to alter the height of the nut 38 to correspond to a height of a square nut.

As depicted, the first lower portion plate 138 and the second lower portion plate 142 are downwardly oriented from an upper surface 146 of the lower portion 82 and are substantially planar. The first lower portion plate 138 includes a leading edge 150a that has an arcuate portion 154a configured to matingly engage an external thread of a bolt, and the second lower portion plate 142 includes a leading edge 150b that has an arcuate portion 154b configured to matingly engage an external thread of a bolt. The arcuate portions 154a, 154b have a thickness that is less than the pitch of an external thread of a preselected bolt, and the arcuate portions 154a, 154b may include at least one chamfered edge 116 that corresponds to the angle of the external thread of the preselected bolt.

The arcuate portions 154a, 154b generally define a lower portion aperture 158 that is axially aligned with the upper portion aperture 118 and is configured to receive the preselected bolt. For example, the lower portion aperture 158 generally has a diameter that is greater than a minor diameter, but smaller than a major diameter, of a preselected externally-threaded bolt. Thus, when a bolt is threaded into the lower portion 82 of the double-thread speed nut 38, the external thread of the bolt is threaded between the leading edges 150a, 150b of the first lower portion plate 138 and the second lower portion plate 142. The arcuate portion 154a will engage the external thread of the bolt on one side of the preselected bolt, and the arcuate portion 154b will engage the external thread of the bolt on an opposing side of the preselected bolt. The first lower portion plate 138 and the second lower portion plate 142 may elastically deform to allow the leading edges 150a, 150b and the arcuate portions 154a, 154b to conform to the helix of the external thread of the preselected bolt.

In addition, the first lower portion plate 138 and the second lower portion plate 142 may elastically deform upward upon tightening of the bolt. The upward deformation of the first lower portion plate 138 and the second lower portion plate 142 may decrease the distance between the arcuate portions 154a, 154b, thereby reducing the diameter of the lower portion aperture 158 to a distance in which the arcuate portions 154a, 154b may squeeze the shank and/or external thread of the bolt. In this fashion, the elastic deformation of the first upper portion plate 98, the second upper portion plate 102, the first lower portion plate 138, and/or the second lower portion plate 142 may increase the torque capability of the double-thread speed nut 38 to provide similar torque capability as a solid nut while weighing substantially less than the solid nut. In one embodiment, a double-thread speed nut 38 weighs about 50 to 75% less than a solid nut with comparable torque capabilities. In another embodiment, a double-thread speed nut 38 weighs about 60% less than a solid nut with comparable torque capabilities. The reduction in weight, yet retention of torque capability, results in a significant reduction in the amount of material utilized in manufacturing a double-thread speed nut 38 as compared to corresponding solid nuts.

As should be appreciated by one of skill in the art, a given configuration of the first lower portion plate 138 and the second lower portion plate 142 may be able to accommodate more than one type of bolt. In the depicted embodiment, the first lower portion plate 138 is substantially parallel to the first upper portion plate 98, and the second lower portion plate 142 is substantially parallel to the second upper portion plate 102. Further, as depicted, the first lower portion plate 138, the first foot segment 122, and the second foot segment 126 generally oppose, and are not connected to, the second lower portion plate 142, the third foot segment 130, and the fourth foot segment 134. In this configuration, as is later discussed, the double-thread speed nut 38 can be formed from a single strip of material.

Referring back to FIGS. 7-14, a sidewall portion 86 integrally connects the upper portion 78 and the lower portion 82. The sidewall portion 86 comprises a first sidewall 162 opposed by, and spaced apart from, a second sidewall 166. In one configuration, the first sidewall 162 and the second sidewall 166 are substantially parallel. As depicted, the sidewall portion 86 has two open sides which allow dirt and/or debris to exit from the double-thread speed nut 38, which generally reduces the heat generated when threadably engaging the nut 38 with a bolt. The height of the sidewall portion 86 generally defines the gap between the upper portion 78 and the lower portion 82. The dimensions of the gap may be altered depending upon an external thread of a preselected bolt. Generally, the gap corresponds to a pitch of an external thread of a preselected bolt. For example, the gap may be a multiple of the pitch of the external thread of the preselected bolt. Thus, the corresponding upper and lower plates may be spaced apart by a gap that corresponds to the pitch of the external thread of the preselected bolt, thereby ensuring the double-thread speed nut 38 will threadably engage the external thread of the bolt. In one embodiment, the plates are sufficiently flexible to accommodate for a mismatched pitch between a preselected bolt and the upper and lower plates. In one embodiment, the first bridge 90 and the second bridge 94 integrally connect the first sidewall 162 and the second sidewall 166, thereby enabling the double-thread speed nut 38 to be constructed from a single strip of material.

According to one embodiment, the first upper portion plate 98, the second upper portion plate 102, the first lower portion plate 138, and the second lower portion plate 142 are angled between about five to about fifteen degrees relative to a horizontal plane. In another embodiment, the first upper portion plate 98 and the second upper portion plate 102 are oriented at different angles. In a similar embodiment, the first lower portion plate 138 and the second lower portion plate 142 are oriented at different angles. In one embodiment, the first upper portion plate 98 and the first lower portion plate 138 are substantially parallel, and the second upper portion plate 102 and the second lower portion plate 142 are substantially parallel. In one embodiment, the double-thread speed nut 38 comprises a rectangular shape, which may be square.

Figure 15:
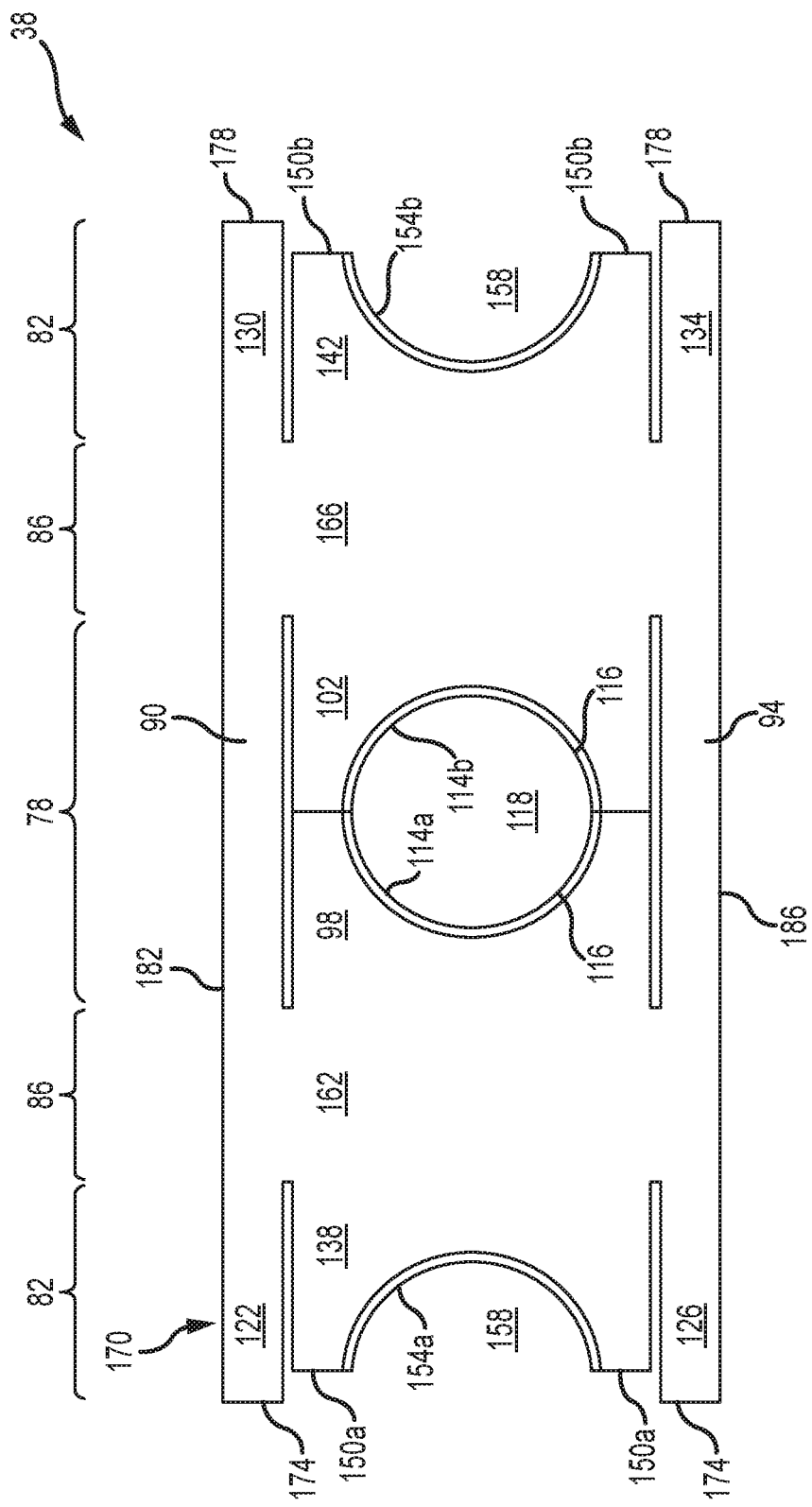
FIG. 15 is a top plan view of one embodiment of a flat pattern of a double-thread speed nut.

Referring now to FIG. 15, a top plan view of one embodiment of a flat pattern of a double-thread speed nut 38 is provided. To manufacture a double-thread speed nut 38 according to one embodiment, a substantially planar strip of material is obtained. In one embodiment, the material is sheet metal. The planar strip generally includes a first end 174, a second end 178, a first side 182, and a second side 186. A first aperture 118 may be formed near the center of the strip 170. Generally, the first aperture 118 is associated with an area of the strip 170 defining an upper portion 78 of the double-thread speed nut 38.

The manufacturing process also includes forming a first plate 138 near the first end 174 of the strip 170 and a second plate 142 near the second end 178 of the strip 170. The first plate 138 is formed to have a leading edge 150*a* with an arcuate portion 154*a*, and the second plate 142 is formed to have a leading edge 150*b* with an arcuate portion 154*b*. As depicted, the arcuate portion 154*a* of the first plate 138 is directed away from the arcuate portion 154*b* of the second plate 142.

Once the first plate 98 and the second plate 102 have been formed, the first end 174 and the second end 178 are folded relative to the upper portion 78 of the double-thread speed nut 38 to define a first sidewall 162 and a second sidewall 166 of the double-thread speed nut 38. In this folded state, the first sidewall 162 and the second sidewall 166 form a sidewall portion 86 of the double-thread speed nut 38.

Next, the first end 174 and the second end 178 of the strip 170 are folded relative to the first sidewall 162 and the second sidewall 166, respectively, to define a lower portion 82 of the double-thread speed nut 38. In this folded state, the arcuate portion 154*a* of the first plate 138 opposes the arcuate portion 154*b* of the second plate 142 to define a second aperture 158 that is axially aligned with the first aperture 118.

Optionally, a third plate 98 and a fourth plate 102 may be formed near the center of the strip 170. The third plate 98 may be formed to have a leading edge with an arcuate portion 114*a*, and the fourth plate 102 may be formed to have a leading edge with an arcuate portion 114*b*. As depicted, the arcuate portion 114*a* of the third plate 98 opposes the arcuate portion 114*b* of the fourth plate 102 to define the first aperture 118. Generally, the third plate 98 and the fourth plate 102 are associated with the upper portion 78 of the manufactured double-thread speed nut 38.

Figure 16:
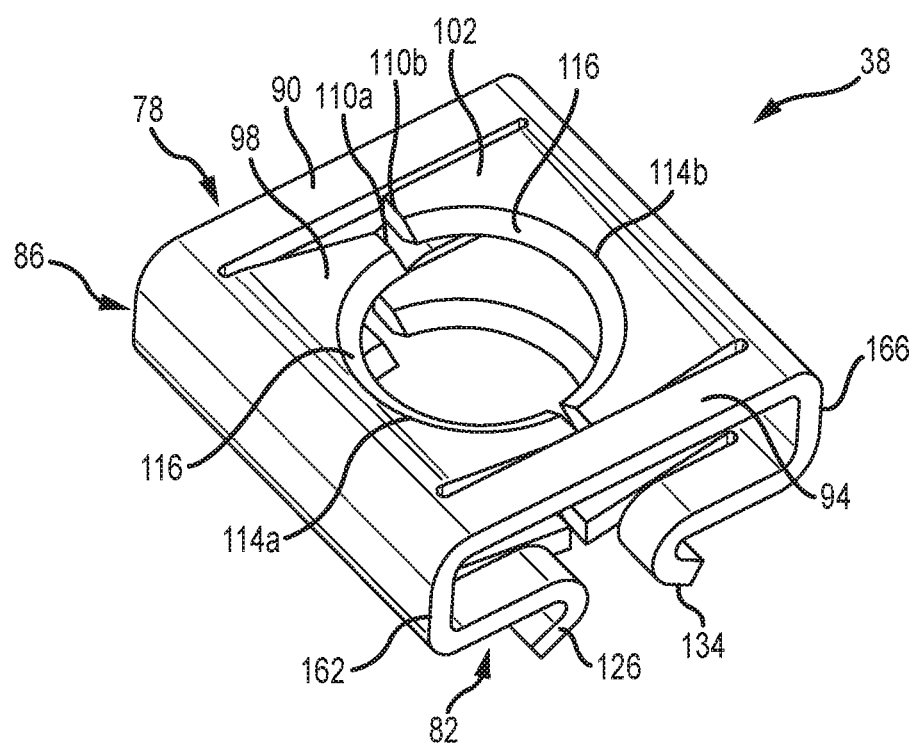
FIG. 16 is a front top perspective view of one embodiment of a double-thread speed nut.
Figure 17:
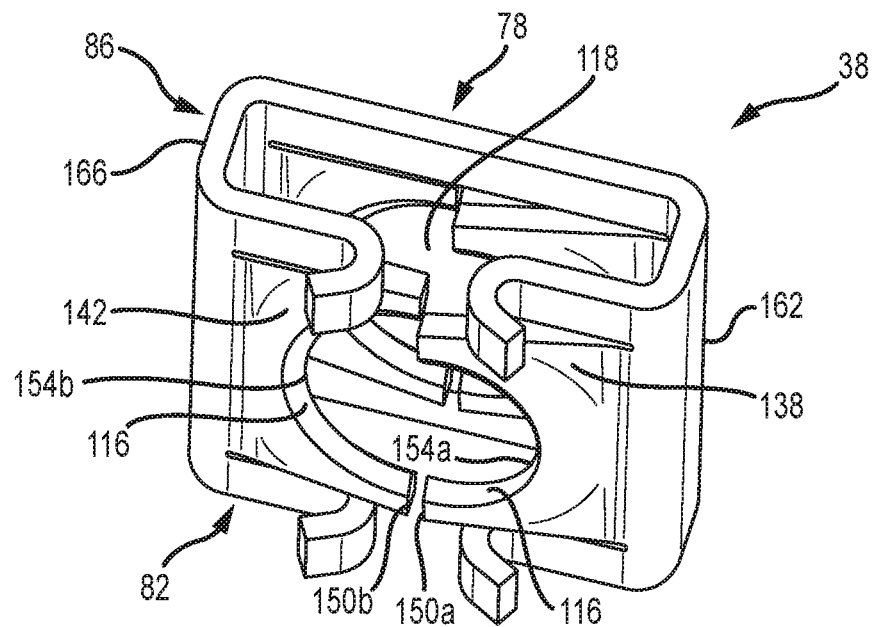
FIG. 17 is a back bottom perspective view of the double-thread speed nut shown in FIG. 16.
Figure 18:
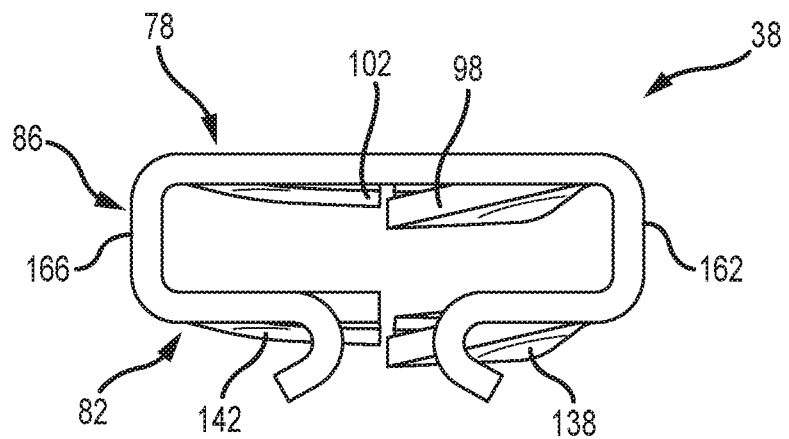
FIG. 18 is a back elevation view of the double-thread speed nut shown in FIG. 16.

Referring to FIGS. 16-18, another embodiment of a double-thread speed nut 38 is provided. As illustrated, the double-thread speed nut 38 includes an upper portion 78, a lower portion 82 spaced apart from the upper portion 78 by a gap, and a sidewall portion 86 integrally connecting the upper portion 78 and the lower portion 82.

As depicted, the upper portion 78 comprises a first upper portion plate 98 and a second upper portion plate 102. In addition, the lower portion 82 comprises a first lower portion plate 138 and a second lower portion plate 142. In contrast to the embodiment depicted in FIGS. 7-14, the plates 98, 102, 138, 142 depicted in FIGS. 16-18 are contoured. As illustrated, the first upper portion plate 98 and the second upper portion plate 102 are contoured such that arcuate portions 114*a*, 114*b* substantially correspond to a helix of an external thread of a bolt. Similarly, the first lower portion plate 138 and the second lower portion plate 142 are contoured such that arcuate portions 154*a*, 154*b* substantially correspond to a helix of an external thread of a bolt. One opposing set of leading edges 110*a*, 110*b* of the upper portion 78 of the double-thread speed nut 38 are vertically offset from each other to allow passage of an external thread of a bolt. Similarly, one opposing set of leading edges 150*a*, 150*b* of the lower portion 82 of the double-thread speed nut 38 are vertically offset from each other to allow passage of an external thread of a bolt.

Generally, the first upper portion plate 98 and the second upper portion plate 102 oppose each other and are positioned between the first bridge 90 and the second bridge 94. However, in an alternative embodiment, the upper portion 78 may be substantially continuous. In this alternative embodiment, the upper portion 78 does not include a first bridge 90, a second bridge 94, a first upper portion plate 98, or a second upper portion plate 102. Rather, a first aperture 118 may be formed near the center of the strip 170 having a perimeter configured to correspond to a helix of an external thread of a bolt. A slot extending perpendicular to the perimeter of the first aperture 118 may be formed near one side of the first aperture 118 and may intersect the perimeter of the first aperture. The slot may be configured to accommodate the passage of an external thread of a bolt, thereby allowing the bolt to be threaded through the first aperture 118. For example, the slot may form one opposing set of leading edges 110a, 110b that are vertically offset from each other to allow passage of an external thread of a bolt.

Figure 19:
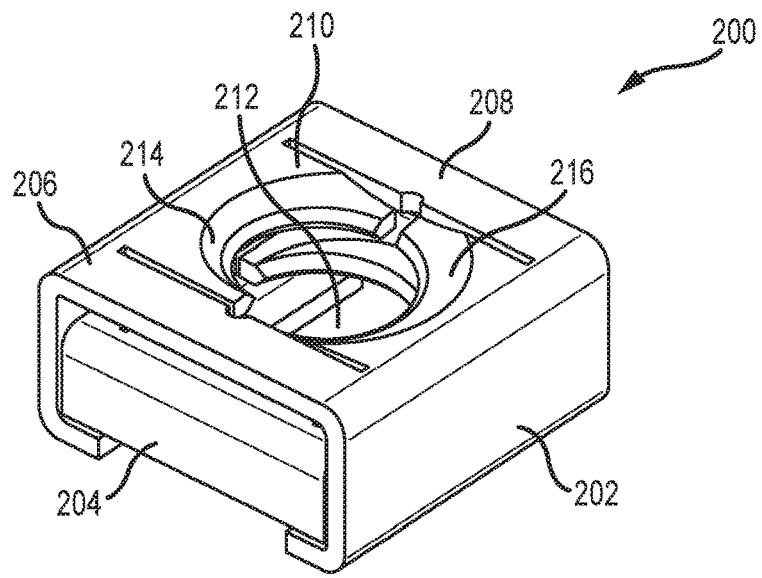
FIG. 19 is a perspective view of a double-thread speed nut according to one embodiment.
Figure 20:
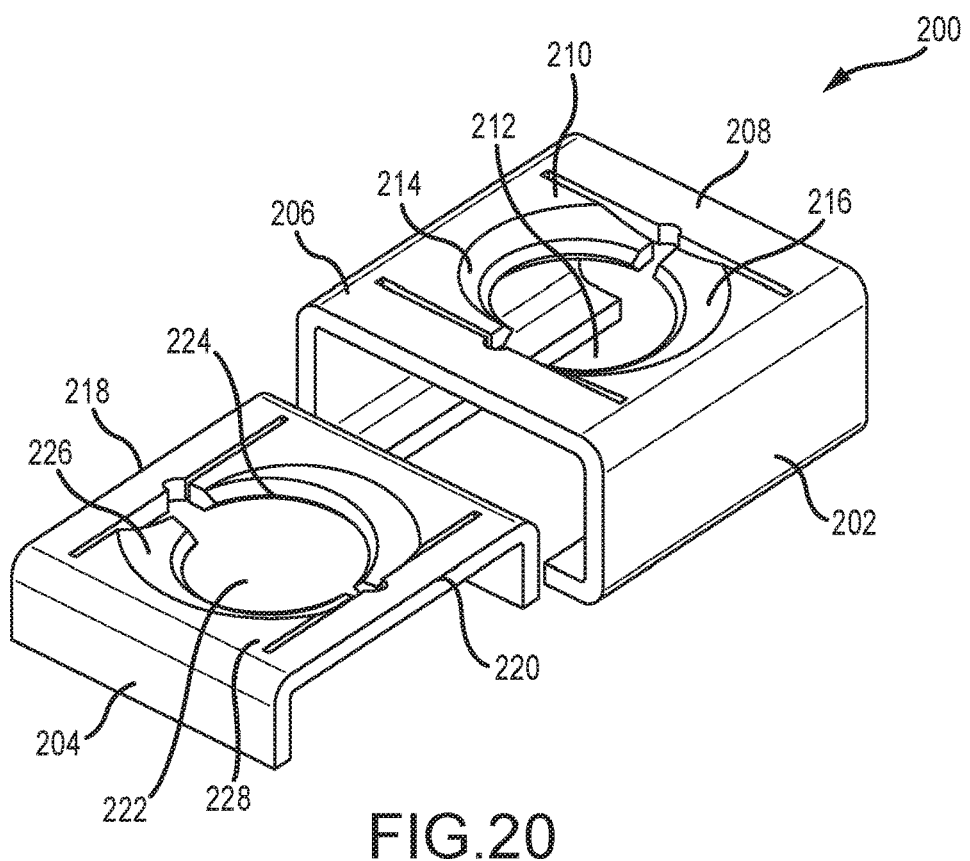
FIG. 20 is a perspective view of a double-thread speed nut according to one embodiment.
Figure 21:
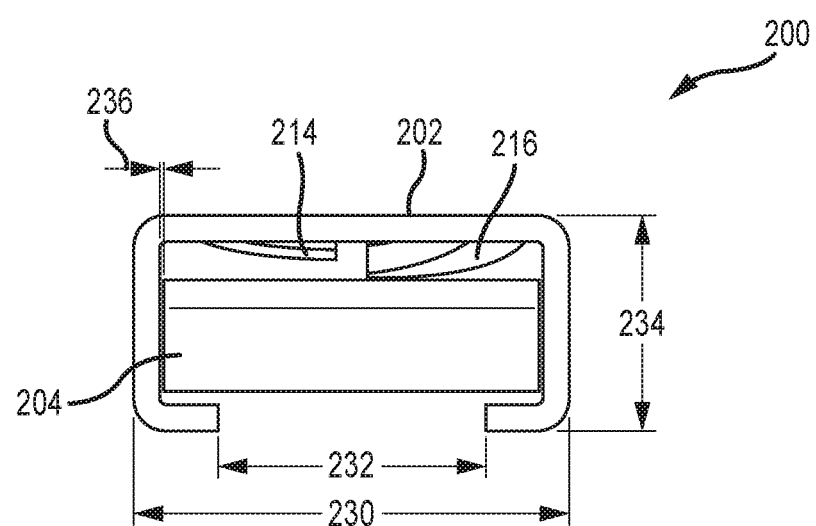
FIG. 21 is a side elevation view of a double-thread speed nut according to one embodiment.

FIGS. 19-21 depict one embodiment of a nut 200 comprising a multi-piece construction. Referring to FIG. 19, a nut 200 is provided comprising a first member 202 and second member 204, the second member 204 being received by and provided substantially within a void space of the first member 202. The first member 202 comprises first 206 and second 208 bridge members, the first 206 and second 208 bridge members being disposed substantially parallel to one another and joining opposing side walls of the nut 200. An upper portion 210 of the nut 200 comprises an aperture 212 for receiving a bolt. Peripheries of the aperture 212 comprise at least one downwardly sloping feature and preferably first 214 and second 216 downwardly sloping features extending between the upper surface 210 of the nut 200 and a substantially annular circumference of the aperture. A second member 204 is provided in combination with the first member 202. The second member 204 is slidably disposed within the first member 202 and comprises nut and bolt securement features as shown and described herein.

FIG. 20 is a perspective view of the nut 200 according to the embodiment of FIG. 19 with the second member 204 disengaged or withdrawn from the first member 202. The second member 204 comprises first 218 and second 220 bridge members provided between opposing side walls and being substantially parallel with one another. First 218 and second 220 bridge members are provided adjacent an aperture 222 of the second member 204. The aperture 222 is adapted to be disposed substantially concentrically with the aperture 212 of the first member 202 when the second member 204 is nested or placed within the first member first member 202. Peripheries of the aperture 222 comprise at least one downwardly sloping feature and preferably first 224 and second 226 downwardly sloping features extending between the upper surface 228 of the second member 204 and a substantially annular circumference of the aperture. Interior portions of the downwardly sloping features 214, 216, 224, 226 may be offset with respect to one another to engage a thread pattern of one or more known bolts. This offset will be determined based on the known or standard thread size and pattern.

FIG. 21 is a side elevation view of a nut 200 according to one embodiment and comprising first 202 and second 204 portions. First 214 and second 216 downwardly sloping features are depicted, wherein the second downwardly sloping feature 216 is offset and disposed at a lower position with respect to the first downwardly sloping feature 214. Such an offset is provided so that interior lip or peripheral portions of the features are provided to engage one or more standard thread patterns on a bolt. In various embodiments, the first member 202 comprises a width 230 of between approximately 0.50 and 1.00 inches. In certain embodiments, the first member 202 comprises a width 230 of between approximately 0.750 and 0.90 inches. In a preferred embodiment, the first member 202 comprises a width of approximately 0.860 inches. Various embodiments contemplate that the nut 200 comprises a substantially square geometry such that a length corresponds to the width. In various embodiments, the first member 202 comprises a height 234 of between approximately 0.25 and 0.75 inches. In certain embodiments, the first member 202 comprises a height 234 of between approximately 0.40 and 050 inches. In a preferred embodiment, the first member 202 comprises a height 234 of approximately 0.418 inches. A gap distance 232 is provided in a lower portion of the nut 200, the gap distance being between approximately 0.40 inches and 0.60 inches. In one embodiment, the gap distance 232 is provided as approximately 0.531 inches. A width of the second member 204 is provided such that there is a tolerance or gap space 236 between the first 202 and second 204 members. In various embodiments, this tolerance 236 is provided as being between approximately 0.010 inches and 0.02 inches. In certain embodiments, this tolerance 236 is contemplated as being at least 0.010 inches and preferably not less than 0.012 inches.

Figure 24:
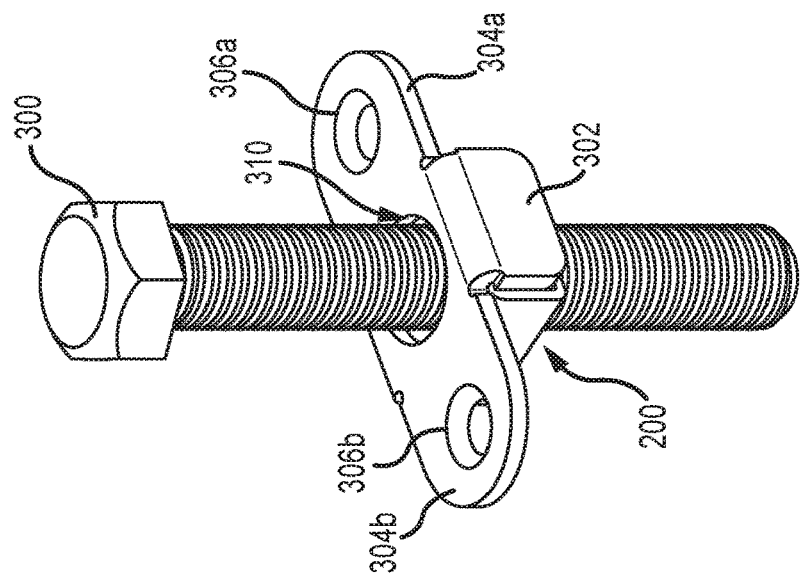
FIG. 24 is a perspective view of one embodiment of a double-thread speed nut and bolt.
Figure 23:
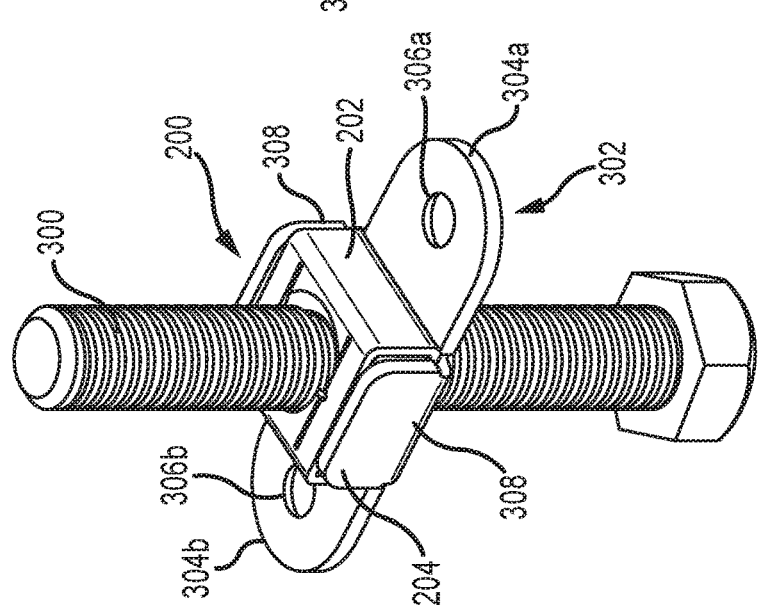
FIG. 23 is a perspective view of one embodiment of a double-thread speed nut and bolt.
Figure 22:
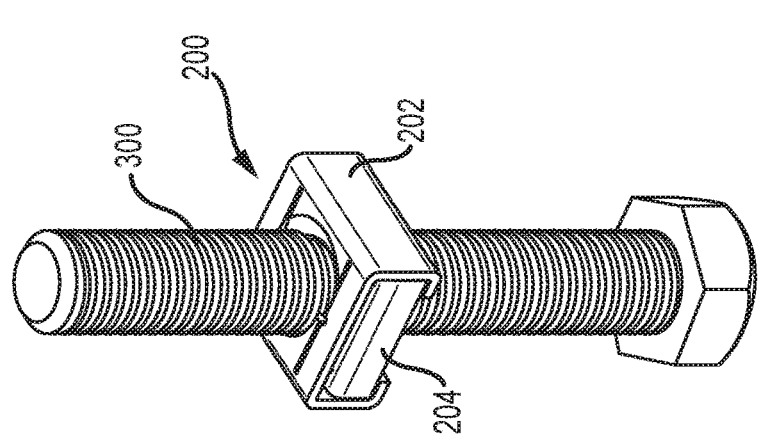
FIG. 22 is a perspective view of one embodiment of a double-thread speed nut and bolt.

FIGS. 22-24 depict one embodiment of a nut 200 with a bolt 300 disposed therein. FIG. 22 is a perspective view of one embodiment of the nut 200 provided on a bolt 300. The nut 200 is provided without a retainer and with at least a portion of the bolt 300 threaded through the first member 202 and the second member 204. FIG. 22 depicts a nut 200 of the present invention in isolation and without a retainer member. It will be recognized, however, that such an arrangement of features of the present disclosure may be provided and/or desirable where the nut is provided in close proximity to additional features, such as a vault side-wall, that prevent undesired rotation of the nut 200 and allow the bolt 300 be threaded through the nut 200 with relative ease.

FIGS. 23-24 depict one embodiment of a nut 200 disposed on a bolt 300 and further comprising a retainer bracket 302. The retainer bracket 302 comprises extension members 304a, 304b. Extension members 304a, 304b are provided to oppose rotation of the retainer bracket 302. To further assist in opposition of rotation, apertures 306a, 306b are further provided in extension members, such apertures 306a, 306b adapted for receiving additional fasteners (not shown). The retainer bracket 302 further comprises peripheral portions 308 for surrounding the nut 200 on at least two sides. As shown, peripheral portions 308 are provided substantially perpendicular to a remainder of the retainer bracket 302. The bracket 302 comprises a through hole 310 for receiving the bolt 300 and being generally aligned with the apertures in the nut 200.

Figure 25:
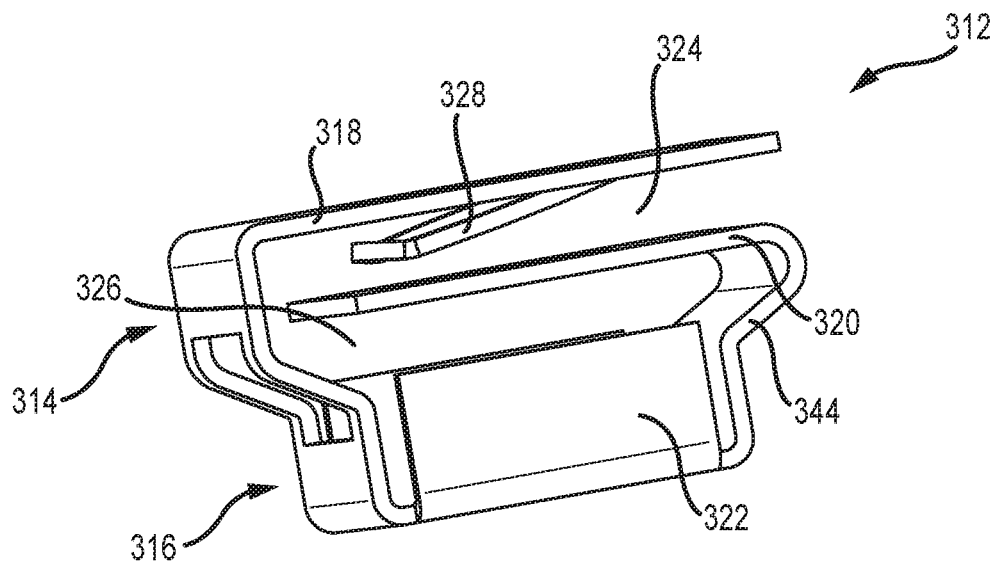
FIG. 25 is a perspective view of one embodiment of a floating nut cage.
Figure 26:
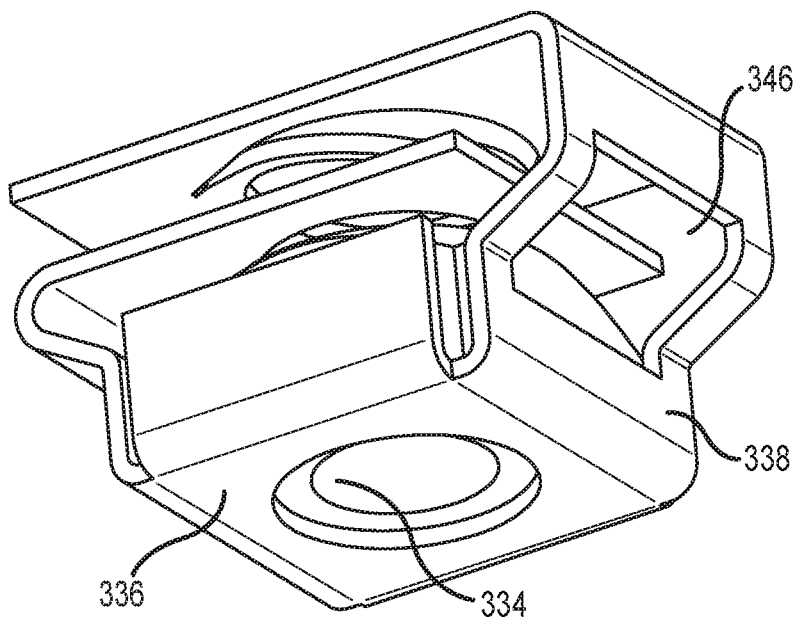
FIG. 26 is a perspective view of one embodiment of a floating nut cage.
Figure 27:
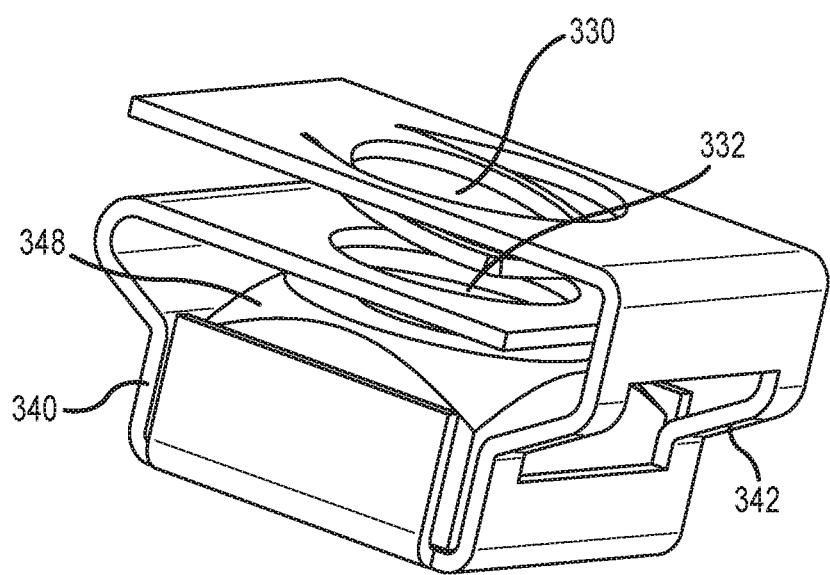
FIG. 27 is a perspective view of one embodiment of a floating nut cage.

FIGS. 25-27 depict one embodiment of a floating nut cage 312. As illustrated, the floating nut cage 312 includes an upper portion 314 having a first plate 318 and a second plate 320 spaced apart from the first plate 318 by a first gap 324, and a lower portion 316 having a cage 322 spaced apart from the second plate 320 by a second gap 326, wherein the upper portion 314 and the lower portion 316 are integrally interconnected. The floating nut cage may be utilized with any type of enclosure, including but not limited to a utility vault, a HDPE flare-wall box, a HDPE straight-wall box application, a HW box, and a concrete box.

As shown, the first plate 318 comprises a substantially planar surface which further includes a downward extending plane 328 having a first aperture 330. The plane 328 extends downward into the first gap 324 which separates the first plate 318 and second plate 320. The plane 328 acts to provide additional open space between a bolt and the nut cage 312 to aid in the prevention of dirt or grime buildup. Additionally, the plane 328 makes contact with, for example, a corner bracket to increase the friction between the floating nut cage 312 and the corner bracket, improving the connection between the pieces before the bolt is added. The first aperture 330 may be sized to accommodate a variety of bolts including, but not limited to, a ½-13 UNC thread bolt, a ½-6 coil-thread bolt, and a ½" lag, or auger, bolt. The first aperture 330 may also be configured to receive a right-hand and a left-hand thread. Moreover, as should be appreciated, the dimensions of the first aperture 330 can be altered to accommodate any bolt on other similar type hardware, including any thread on similar engagement mechanism.

Similarly, the second plate 320 comprises a substantially planar surface having a second aperture 332 also configured to receive a bolt. The second aperture 332 may be sized to accommodate a variety of bolts including, but not limited to, a ½-13 UNC thread bolt, a ½-6 coil-thread bolt, and a ½" lag, or auger, bolt. The second aperture 332 may also be configured to receive a right-hand and a left-hand thread. Moreover, as should be appreciated, the dimensions of the second aperture 332 can be altered to accommodate any bolt, including any thread.

The first plate 318 and the second plate 320 are disposed such that a first gap 324 is provided between the two plates 318 and 320. As will be described in further detail with reference to FIGS. 28-30, the first gap 324 allows the floating cage nut 312 to selectively interconnect with a corner bracket 350. The first plate 318 and second plate 320 are further disposed such that the first aperture 330 and second aperture 332 align along a central, vertical axis so that a bolt can extend through both the first aperture 330 and the second aperture 332. Accordingly, it should be appreciated that while both apertures 330 and 332 can be configured to receive a variety of bolts having a variety of threads, the first aperture 330 and the second aperture 332 should be configured to receive the same bolt having the same thread. Further, the second plate 320 is disposed above the cage 322 in such a way as to create a second gap 320 between the second plate 320 and the cage 322. The second gap 320 adds additional space between the top surface of a nut 348 to further prevent the buildup of dirt and grime which may occur if the nut 348 were in direct contact with the second plate 320.

As shown, the cage 322 has four sidewalls, including a first sidewall 338 and a second sidewall 340 opposite the first sidewall 338, and a base 336. The base 336 comprises a third aperture 334. The third aperture 334 may be sized to accommodate a variety of bolts including, but not limited to, a ½-13 UNC thread bolt, a ½-6 coil-thread bolt, and a ½" lag, or auger, bolt. The third aperture 334 may also be configured to receive a right-hand and left-hand thread. Moreover, as should be appreciated, the dimensions of the third aperture 334 can be altered to accommodate any bolt, including any thread. The cage 322 is further disposed such that the third aperture 334 aligns along a central, vertical axis such that the third aperture 334 is aligned with the first aperture 330 and the second aperture 332, such that a bolt is able to extend through the first aperture 330, the second aperture 332, and the third aperture 334. Accordingly, it should be appreciated that while the apertures 330, 332, and 334 can be configured to receive a variety of bolts having a variety of threads, the first aperture 330, the second aperture 332, and the third aperture 334 should be configured to receive the same bolt having the same thread.

The cage 322 is also configured to receive and house a nut 348. The nut 348 rests on the base 336, held in place by the four sidewalls, and is disposed such that the thread of the nut 348 is aligned along the central, vertical axis such that the thread of the nut 348 is coaxial with the three apertures including 330, 332, and 334, so that a bolt may extend through the apertures 330, 332, and 334 and the nut. While the embodiments of FIGS. 26-27 utilize a ½" square nut, one skilled in the art would appreciate that the cage can be designed to house a variety of nuts 348, including but not limited to the double thread speed nut embodiments disclosed in FIGS. 2-24. While a variety of nuts 348 may be utilized in the cage 322, one skilled in the art will recognize that the nut 348 will be selected to accommodate a variety of bolts, including a ½-13 UNC thread bolt, a ½-6 coil-thread bolt, and a ½" lag, or auger, bolt. The nut 348 will also be selected to accommodate either a right-hand or left-hand thread. One skilled in the art will appreciate that the apertures 330, 332, and 334 and the nut 348 should be configured to receive the same bolt and thread.

Referring back to FIGS. 25-27, the upper portion 314 of the floating nut cage 312 is integrally interconnected to the lower portion 316 of the floating nut cage 312. More specifically, in one embodiment the first plate 318 interconnects to the first sidewall 338 of the cage 322 by a first arcuate portion 342. Thus, one skilled in the art would recognize that the downward extending plane 328 extends towards the first arcuate portion 342. In one embodiment, the first arcuate portion 342 has a cut out portion 346 which reduces the weight of the floating nut cage 312. Similarly, the second plate 320 interconnects to the second sidewall 340 of the cage 322 by a second arcuate portion 344. In one embodiment, the first arcuate portion 342 extends outwardly from the first sidewall 338 such that a gap exists between the first arcuate portion 342 and the second plate 320. Similarly, the second arcuate portion 344 extends outwardly from the second sidewall 340 before connecting to the second plate 320. These connections create the impression of a capital letter "G" where the top of the cage 322 represents the bottom of the "G," the first plate 318 represents the top of the "G," and the second plate 320 represents the middle arm of the "G."

Figure 28:
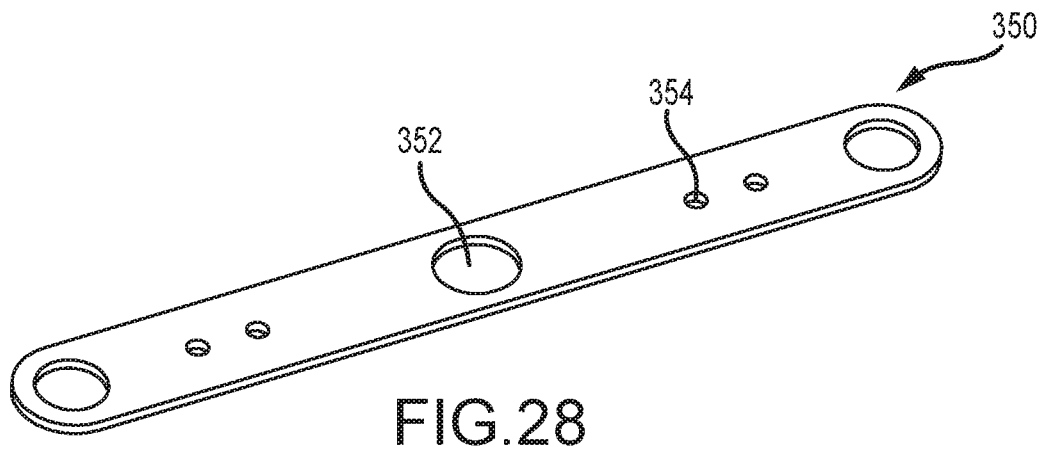
FIG. 28 is a perspective view of a bracket according to one embodiment of the disclosure.
Figure 29:
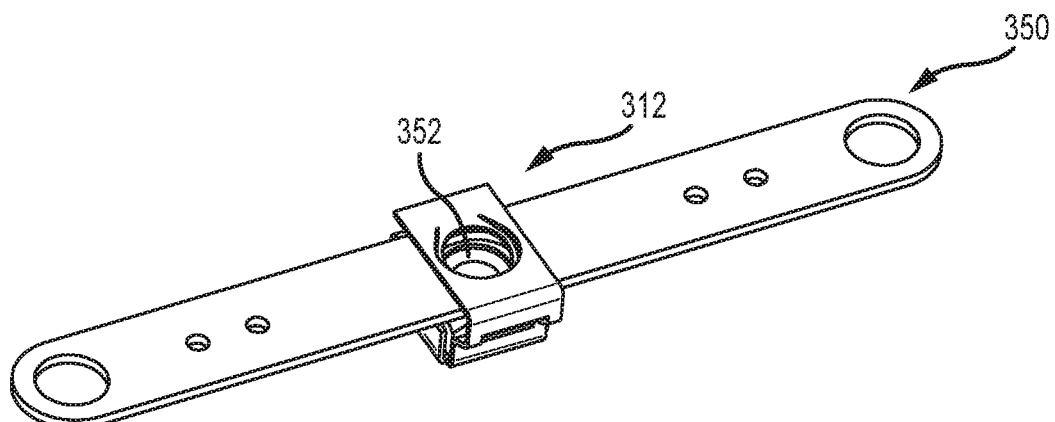
FIG. 29 is a perspective view of one embodiment of a floating nut cage and a corner bracket.
Figure 30:
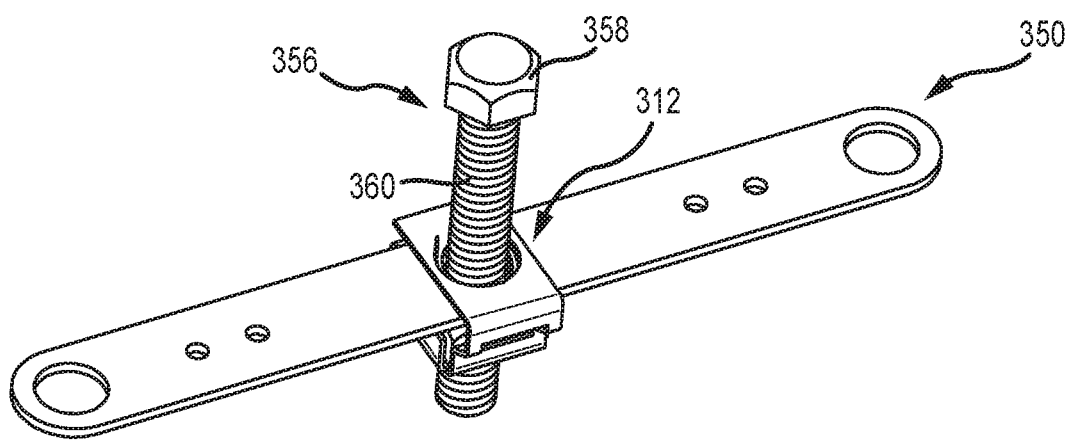
FIG. 30 is a perspective of one embodiment of a floating nut cage, a corner bracket, and a bolt.

Referring now to FIGS. 28-30, the use of the floating nut cage 312 of the present embodiment with a corner bracket 350 is illustrated. This embodiment may be utilized with a conventional utility vault, like that shown in FIG. 1. FIG. 28 shows a corner bracket 350 as described in U.S. Pat. No. 8,835,757 with a design as described in U.S. Design Pat. No. D654,693, both of which are incorporated by reference in their entirety. As shown, the corner bracket 350 has a plurality of large apertures 352 and a plurality of small apertures 354. While the present embodiment utilizes three large apertures 352, one skilled in the art will recognize that a variety of large apertures 352 may be utilized. Similarly, while the present embodiment has four small apertures 354 arranged in two pairs of two, one skilled in the art will recognize that a various number of small apertures 354 may be utilized and may be arranged in a number of different groupings.

FIG. 29 shows the floating nut cage 312 operatively engaging the corner bracket 350. The floating nut cage 312 engages the corner bracket 350 such that the first aperture, second aperture, third aperture, and nut of the floating nut cage 312 align with the large aperture 352 of the corner bracket 350. The floating nut cage 312 engages the corner bracket 350 by sliding the floating nut cage 312 onto the corner bracket 350 such that the corner bracket 350 is disposed within the first gap of the floating nut cage 312. The downward extending plane of the floating nut cage 312 applies a force to the corner bracket 350 such that the corner bracket 350 is secured in the first gap between the first plate and second plate of the floating nut cage. The downward extending plane also has the benefit of creating a space between the first plate and the corner bracket 350 which aids in the removal of dirt and grime build up. This removal is further aided by the outwardly extending first arcuate portion of the floating nut cage 312, which creates an additional space next to the corner bracket 350.

FIG. 30 shows the floating nut cage 312 and corner bracket 350 operatively engaging a bolt 356 having a bolt head 358 and a thread 360. As illustrated, the bolt 356 extends downwardly such that the thread 360 extends through the first aperture of the floating nut cage 312, the large aperture 352 of the corner bracket 350, the second aperture of the floating nut cage 312, the nut, and finally through the third aperture of the floating nut cage 312. As discussed above, the aperture sizes and nut will be selected to accommodate the specific bolt 356 and thread 360. As shown, the plurality of gaps and spaces provided by the floating nut cage 312 prevents the buildup of dirt and grime which could lead to rust and cause the bolt 356 to become stuck, making it difficult or impossible for a user to remove at a later date.

Figure 31:
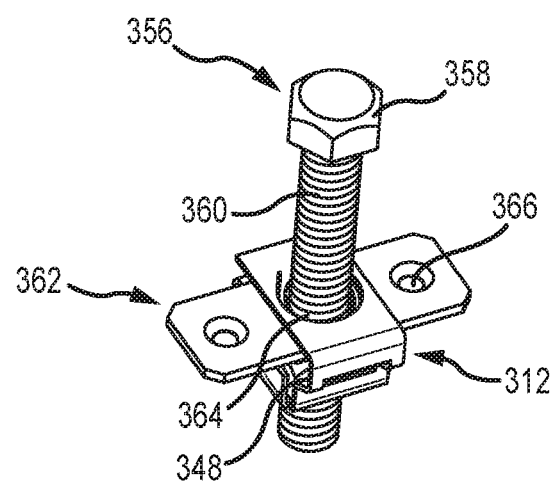
FIG. 31 is a perspective view of a fastener system according to one embodiment of the present disclosure.

Referring now to FIG. 31, the use of the floating nut cage 312 of the present embodiment with a floating nut plate 362 is shown. The floating nut plate has a large aperture 364, which in the present embodiment is located centrally, as well as a plurality of small apertures 366. As illustrated, the bolt 356 extends downwardly such that the thread 360 extends through the first aperture of the floating nut cage 312, the large aperture 364 of the floating nut plate 350, the second aperture of the floating nut cage 312, the nut, and finally through the third aperture of the floating nut cage 312. As discussed above, the aperture 364 size and nut will be selected to accommodate the specific bolt 356 and thread 360.

While various embodiments have been described in detail, it is apparent that modifications and alterations of those embodiments will occur to those skilled in the art. For example, although the folding steps of the manufacturing process have been recited in a particular order, the folding steps can be performed in various orders. In addition, various features of the disclosure are grouped together in one or more aspects, embodiments, or configurations for the purpose of streamlining the disclosure. The various features of the certain aspects, embodiments, or configurations of the disclosure may be combined in alternate aspects, embodiments, or configurations. It is to be expressly understood that such modifications and alterations are within the scope and spirit of the claimed subject matter. In addition, it should be understood that the claimed subject matter is not necessarily limited to the particular embodiments illustrated and/or described herein. Rather, the claimed subject matter, as set forth in the following claims, comprises an additional embodiment that is not limited by the foregoing description.

What is claimed is:

1. A tamper resistant closure mechanism for selectively securing a lid to a utility vault, comprising:
    a utility vault having a plurality of sidewalls and an opening;
    a cap operably engaged to an opening of said utility vault and including a recessed lip;
    a lid sized to rest on said lip with the lid and having a perimeter entirely positioned within the interior edge of said cap;
    a nut and bolt;
    a locking assembly interconnected to said cap, said locking assembly comprising:
        an upper planar member having a first aperture configured to receive a bolt, and an angled portion, wherein the angled portion extends downward and further including a second aperture;
        a middle planar member spaced apart from the upper portion by a gap, the middle portion comprising a third aperture;
        a lower portion comprising at least a base and sidewalls, the lower portion spaced apart from the middle portion by a second gap, the lower portion further having a fourth aperture and being adapted to house a nut; and
    wherein the bolt extends downward through the apertures of the locking assembly and through the nut.

2. The tamper resistant closure mechanism of claim 1, wherein the top planar member is connected to a sidewall of the lower portion by a first arcuate portion.

3. The tamper resistant closure mechanism of claim 2, wherein the first arcuate portion further comprises a cut out portion.

4. The tamper resistant closure mechanism of claim 2, wherein the middle planar member is connected to a sidewall of the lower portion by a second arcuate portion.

5. The tamper resistant closure mechanism of claim 1, further comprising a nut, wherein the nut comprises a square shape that is interchangeable with a corresponding square nut.

6. The tamper resistant closure mechanism of claim 1, further comprising a plate adapted to be received in the utility vault, wherein the plate is received in the gap between the upper planar member and middle planar member of the locking assembly.

7. A locking assembly for use in a utility vault, comprising:
    an upper planar member having a first aperture configured to receive a bolt, and an angled portion, wherein the angled portion extends downward and further including a second aperture;
    a middle planar member spaced apart from the upper portion by a gap, the middle portion comprising a third aperture;
    a lower portion comprising at least a base and sidewalls, the lower portion spaced apart from the middle portion by a second gap, the lower portion further having a fourth aperture and being adapted to house a nut; and
    a nut and a bolt, the bolt extending downward through the apertures of the locking assembly and through the nut.

8. The locking assembly of claim 7, wherein the top planar member is connected to a sidewall of the lower portion by a first arcuate portion.

9. The locking assembly of claim 8, wherein the first arcuate portion further comprises a cut out portion.

10. The locking assembly of claim 8, wherein the middle planar member is connected to a sidewall of the lower portion by a second arcuate portion.

11. The locking assembly of claim 7, further comprising a nut, wherein the nut comprises a square shape that is interchangeable with a corresponding square nut.

12. The locking assembly of claim 7, further comprising a plate adapted to be received in the utility vault, wherein the plate is received in the gap between the upper planar member and middle planar member of the locking assembly.

13. A locking assembly for use in a utility vault, comprising:
    a lower portion, the lower portion comprising a base and sidewalls, the base further comprising a first aperture;
    a middle planar member spaced apart from the lower portion by a gap and comprising a second aperture, the middle planar portion connected to one of the lower portion sidewalls by a first arcuate connection; and
    a top planar member spaced apart from the middle planar member by a second gap, the top planar member connected to one of the lower portion sidewalls by a second arcuate connection, the top planar member further comprising an angled portion extending downward into the second gap and comprising a third aperture, wherein the first, second, and third aperture are aligned along a central axis.

14. The locking assembly of claim 13, wherein the angled portion is circular in shape.

15. The locking assembly of claim 13, wherein the locking assembly is formed from a single piece of metal.

16. The locking assembly of claim 13, wherein the first arcuate connection and second arcuate connection are disposed opposite of one another.

17. The locking assembly of claim 13, wherein the angled portion extends downward in the direction of the second arcuate connection.

18. The locking assembly of claim 13, further comprising a nut, where the nut is housed in the lower portion, such that the nut is aligned with the apertures along the central axis.

\* \* \* \* \*